United States Patent
Long et al.

(10) Patent No.: US 9,182,034 B2
(45) Date of Patent: Nov. 10, 2015

(54) MODULATION CONTROL SYSTEM AND METHOD FOR A HYBRID TRANSMISSION

(71) Applicant: Allison Transmission, Inc., Indianapolis, IN (US)

(72) Inventors: Charles F. Long, Pittsboro, IN (US); Charles T. Taylor, Indianapolis, IN (US)

(73) Assignee: Allison Transmission, Inc., Indianapolis, IN (US)

( * ) Notice: Subject to any disclaimer, the term of this patent is extended or adjusted under 35 U.S.C. 154(b) by 213 days.

(21) Appl. No.: 13/846,971

(22) Filed: Mar. 19, 2013

(65) Prior Publication Data

US 2013/0213501 A1 Aug. 22, 2013

Related U.S. Application Data

(63) Continuation of application No. PCT/US2012/025457, filed on Feb. 16, 2012.

(60) Provisional application No. 61/443,750, filed on Feb. 17, 2011.

(51) Int. Cl.
*F16H 61/00* (2006.01)
*B60K 6/48* (2007.10)
(Continued)

(52) U.S. Cl.
CPC .............. *F16H 61/0031* (2013.01); *B60K 6/12* (2013.01); *B60K 6/20* (2013.01); *B60K 6/48* (2013.01); *F16D 25/14* (2013.01); *F16H 61/0021* (2013.01); *F16H 61/0206* (2013.01); *B60Y 2200/92* (2013.01); *Y02T 10/6221* (2013.01); *Y10S 903/902* (2013.01);
(Continued)

(58) Field of Classification Search
CPC .................................................... F16H 61/0031
USPC .......................................................... 477/15
See application file for complete search history.

(56) References Cited

U.S. PATENT DOCUMENTS 2,374,822 A    5/1945  Claire
3,025,718 A *  3/1962  Christenson .................. 477/109
(Continued)

FOREIGN PATENT DOCUMENTS

DE           3519026       4/1986
DE   10 2005 015911 A1   10/2006
(Continued)

OTHER PUBLICATIONS

European Supplemental Search Report for European Patent Application No. 12757971.2 dated Aug. 4, 2014.
(Continued)

*Primary Examiner* — Tisha Lewis
(74) *Attorney, Agent, or Firm* — Woodard Emhardt Moriarty McNett & Henry LLP

(57) ABSTRACT

A hydraulic system includes a main modulation control scheme which relies in part on the use of a VBS solenoid and the multiplexing of that solenoid. The hydraulic system is associated with a hybrid module and by controlling the main pressure at a reduced level, the fuel economy and reliability of that hybrid module are improved. The system pressure is controlled by the multiplexed VBS solenoid in order to maintain adequate clutch pressure based on torque requirements. The overall system cost is reduced by the multiplexing of valves and solenoids.

29 Claims, 24 Drawing Sheets

(51) Int. Cl.
  *B60K 6/12*     (2006.01)
  *B60K 6/20*     (2007.10)
  *F16H 61/02*    (2006.01)
  *F16D 48/02*    (2006.01)

(52) U.S. Cl.
  CPC ........ *Y10S 903/903* (2013.01); *Y10T 137/8593* (2015.04); *Y10T 137/85986* (2015.04); *Y10T 137/86131* (2015.04)

(56) References Cited

U.S. PATENT DOCUMENTS

| | | | |
|---|---|---|---|
| 3,800,913 A | 4/1974 | Schmitt | |
| 3,863,739 A | 2/1975 | Schaefer et al. | |
| 4,584,487 A | 4/1986 | Hesse et al. | |
| 4,838,126 A | 6/1989 | Wilfinger et al. | |
| 5,019,757 A | 5/1991 | Beifus | |
| 5,121,714 A | 6/1992 | Susa et al. | |
| 5,209,110 A | 5/1993 | Sano et al. | |
| 5,217,085 A | 6/1993 | Barrie et al. | |
| 5,347,821 A | 9/1994 | Oltman et al. | |
| 5,362,206 A | 11/1994 | Westerman et al. | |
| 5,415,603 A | 5/1995 | Tuzuki et al. | |
| 5,447,414 A | 9/1995 | Nordby et al. | |
| 5,606,946 A | 3/1997 | Data et al. | |
| 5,669,464 A | 9/1997 | Earleson | |
| 5,736,823 A | 4/1998 | Nordby et al. | |
| 5,752,482 A | 5/1998 | Roettgen et al. | |
| 5,823,282 A | 10/1998 | Yamaguchi | |
| 5,895,099 A | 4/1999 | Diecke et al. | |
| 5,944,632 A | 8/1999 | Hara et al. | |
| 6,172,602 B1 | 1/2001 | Hasfjord | |
| 6,209,672 B1* | 4/2001 | Severinsky | 180/65.23 |
| 6,244,825 B1 | 6/2001 | Sasaki et al. | |
| 6,292,731 B1* | 9/2001 | Kirchhoffer et al. | 701/55 |
| 6,305,664 B1* | 10/2001 | Holmes et al. | 251/129.18 |
| 6,390,947 B1 | 5/2002 | Aoki et al. | |
| 6,527,074 B1 | 3/2003 | Morishita | |
| 6,607,142 B1 | 8/2003 | Boggs et al. | |
| 6,638,022 B2 | 10/2003 | Shimabukuro et al. | |
| 6,647,326 B2 | 11/2003 | Nakamori et al. | |
| 6,716,138 B2 | 4/2004 | Matsubara et al. | |
| 7,041,030 B2 | 5/2006 | Kuroda et al. | |
| 7,082,758 B2 | 8/2006 | Kageyama et al. | |
| 7,117,120 B2 | 10/2006 | Beck et al. | |
| 7,168,924 B2 | 1/2007 | Beck et al. | |
| 7,174,876 B2 | 2/2007 | Suzuki et al. | |
| 7,192,518 B2 | 3/2007 | Roesgen | |
| 7,255,214 B2 | 8/2007 | Long et al. | |
| 7,285,066 B2 | 10/2007 | Long et al. | |
| 7,288,039 B2 | 10/2007 | Foster et al. | |
| 7,396,306 B2 | 7/2008 | Long et al. | |
| 7,427,914 B2 | 9/2008 | Plantamura | |
| 7,481,053 B2 | 1/2009 | Kitano et al. | |
| 7,543,695 B2 | 6/2009 | Redelman et al. | |
| 7,556,120 B2 | 7/2009 | Sah et al. | |
| 7,558,699 B2 | 7/2009 | Beck et al. | |
| 7,651,427 B2 | 1/2010 | Long et al. | |
| 7,779,958 B2 | 8/2010 | Kitano et al. | |
| 7,946,389 B2 | 5/2011 | Kakinami et al. | |
| 2002/0177960 A1 | 11/2002 | Berndorfer | |
| 2003/0059310 A1 | 3/2003 | Koenig et al. | |
| 2004/0192502 A1 | 9/2004 | Suzuki et al. | |
| 2005/0031443 A1 | 2/2005 | Ohlsson et al. | |
| 2007/0173373 A1 | 7/2007 | Kinugasa et al. | |
| 2007/0240919 A1 | 10/2007 | Carlson | |
| 2008/0017472 A1 | 1/2008 | Redelman et al. | |
| 2008/0067116 A1 | 3/2008 | Anderson et al. | |
| 2008/0121464 A1 | 5/2008 | Ledger | |
| 2008/0260541 A1 | 10/2008 | Lifson et al. | |
| 2009/0014245 A1 | 1/2009 | Shevchenko et al. | |
| 2009/0107755 A1 | 4/2009 | Kothari et al. | |
| 2009/0116155 A1 | 5/2009 | Almalki et al. | |
| 2009/0118878 A1 | 5/2009 | Park | |
| 2009/0235657 A1 | 9/2009 | Rampen et al. | |
| 2009/0247353 A1* | 10/2009 | Tryon et al. | 477/20 |
| 2009/0247355 A1* | 10/2009 | Tryon et al. | 477/52 |
| 2009/0253552 A1* | 10/2009 | Foster | 477/130 |
| 2009/0276119 A1 | 11/2009 | Barker et al. | |
| 2010/0083730 A1 | 4/2010 | Le et al. | |
| 2010/0125023 A1 | 5/2010 | List et al. | |
| 2010/0229824 A1 | 9/2010 | Matsuo et al. | |
| 2010/0332089 A1 | 12/2010 | Gianone et al. | |
| 2011/0039657 A1 | 2/2011 | Gibson et al. | |

FOREIGN PATENT DOCUMENTS

| | | |
|---|---|---|
| DE | 10 2007 004964 A1 | 8/2008 |
| EP | 0515326 | 11/1992 |
| GB | 1471305 | 4/1977 |
| GB | 2 046 376 A | 11/1980 |
| GB | 2402720 | 2/2007 |
| JP | 56-003307 A | 1/1981 |
| JP | 2000337119 A | 5/2000 |
| JP | 2004-067001 | 3/2004 |
| KR | 2005038168 | 4/2005 |
| KR | 10-1039579 B1 | 6/2011 |

OTHER PUBLICATIONS

International Search Report and Written Opinion issued in PCT/US2012/024119, dated Aug. 22, 2012.
International Search Report and Written Opinion issued in PCT/US2012/025451, dated Aug. 27, 2012.
International Search Report and Written Opinion issued in PCT/US2012/025457, dated Dec. 26, 2012.
International Search Report and Written Opinion issued in PCT/US2012/027847, mailed Sep. 26, 2012.
International Search Report and Written Opinion issued in PCT/US2012/043432, dated Oct. 23, 2012.

* cited by examiner

DV SCHEMATIC

MODULATION CONTROL SYSTEM AND METHOD FOR A HYBRID TRANSMISSION

CROSS REFERENCE TO RELATED APPLICATION

This application is a continuation of International Application No. PCT/US2012/025457, filed Feb. 16, 2012 which claims the benefit of U.S. Patent Application Ser. No. 61/443,750 filed Feb. 17, 2011, both of which are hereby incorporated by reference.

BACKGROUND OF THE INVENTION

With the growing concern over global climate change as well as oil supplies, there has been a recent trend to develop various hybrid systems for motor vehicles. While numerous hybrid systems have been proposed, each system typically requires significant modifications to the drive train of the corresponding vehicle. These modifications make it difficult to retrofit the systems to existing vehicles. Moreover, some of these systems have a tendency to cause significant power loss, which in turn hurts the fuel economy for the vehicle. Thus, there is a need for improvement in this field.

One of the areas for improvement of hybrid transmissions is in the construction and arrangement of the hydraulic system. Hybrid vehicles, and in particular the hybrid transmission module associated with such a vehicle, have various lubrication and cooling needs which depend on engine conditions and operational modes. In order to address these needs, oil is delivered by at least one hydraulic pump. The operation of each hydraulic pump is controlled, based in part on the lubrication and cooling needs and based in part on the prioritizing when two hydraulic pumps are included as part of the hydraulic system of the hybrid vehicle. The prioritizing between hydraulic pumps (mechanical and electrical) is based in part on the needs and based in part on the operational state or mode of the hybrid vehicle.

SUMMARY

The hydraulic system (and method) described herein is part of a hybrid transmission module used within a hybrid system adapted for use in vehicles and suitable for use in transportation systems and into other environments. The cooperating hybrid system is generally a self-contained and self-sufficient system which is able to function without the need to significantly drain resources from other systems in the corresponding vehicle or transportation system. The hybrid module includes an electric machine (eMachine).

This self-sufficient design in turn reduces the amount of modifications needed for other systems, such as the transmission and lubrication systems, because the capacities of the other systems do not need to be increased in order to compensate for the increased workload created by the hybrid system. For instance, the hybrid system incorporates its own lubrication and cooling systems that are able to operate independently of the transmission and the engine. The fluid circulation system which can act as a lubricant, hydraulic fluid, and/or coolant, includes a mechanical pump for circulating a fluid, along with an electric pump that supplements the workload for the mechanical pump when needed. As will be explained in further detail below, this dual mechanical/electric pump system helps to reduce the size and weight of the required mechanical pump, and if desired, also allows the system to run in a complete electric mode in which the electric pump solely circulates the fluid.

More specifically, the described hydraulic system (for purposes of the exemplary embodiment) is used in conjunction with a hybrid electric vehicle (HEV). Included as part of the described hydraulic system is a parallel arrangement of a mechanical oil pump and an electric oil pump. The control of each pump and the sequence of operation of each pump depends in part on the operational state or the mode of the hybrid vehicle. Various system modes are described herein relating to the hybrid vehicle. As for the hydraulic system disclosed herein, there are three modes which are specifically described and these three modes include an electric mode (eMode), a transition mode, and a cruise mode.

As will be appreciated from the description which follows, the described hydraulic system (and method) is constructed and arranged for addressing the need for component lubrication and for cooling those portions of the hybrid module which experience an elevated temperature during operation of the vehicle. The specific construction and operational characteristics provide an improved hydraulic system for a hydraulic module.

The compact design of the hybrid module has placed demands and constraints on a number of its subcomponents, such as its hydraulics and the clutch. To provide an axially compact arrangement, the piston for the clutch has a recess in order to receive a piston spring that returns the piston to a normally disengaged position. The recess for the spring in the piston creates an imbalance in the opposing surface areas of the piston. This imbalance is exacerbated by the high centrifugal forces that cause pooling of the fluid, which acts as the hydraulic fluid for the piston. As a result, a nonlinear relationship for piston pressure is formed that makes accurate piston control extremely difficult. To address this issue, the piston has an offset section so that both sides of the piston have the same area and diameter. With the areas being the same, the operation of the clutch can be tightly and reliably controlled. The hydraulics for the clutch also incorporate a spill over feature that reduces the risk of hydrostatic lock, while at the same time ensures proper filling and lubrication.

In addition to acting as the hydraulic fluid for the clutch, the hydraulic fluid also acts as a coolant for the eMachine as well as other components. The hybrid module includes a sleeve that defines a fluid channel that encircles the eMachine for cooling purposes. The sleeve has a number of spray channels that spray the fluid from the fluid channel onto the windings of the stator, thereby cooling the windings, which tend to generally generate the majority of the heat for the eMachine. The fluid has a tendency to leak from the hybrid module and around the torque converter. To prevent power loss of the torque converter, the area around the torque converter should be relatively dry, that is, free from the fluid. To keep the fluid from escaping and invading the torque converter, the hybrid module includes a slinger arrangement. Specifically, the hybrid module has a impeller blade that propels the fluid back into the eMachine through a window. Subsequently, the fluid is then drained into the sump so that it can be scavenged and recirculated.

The hybrid module has a number of different operational modes. During the start mode, the battery supplies power to the eMachine as well as to the electric pump. Once the pump achieves the desired oil pressure, the clutch piston is stroked to apply the clutch. With the clutch engaged, the eMachine applies power to start the engine. During the electro-propulsion only mode the clutch is disengaged, and only the eMachine is used to power the torque converter. In the propulsion assist mode, the engine's clutch is engaged, and the eMachine acts as a motor in which both the engine and eMachine drive the torque converter. While in a propulsion-charge mode, the clutch is engaged, and the internal combustion engine solely drives the vehicle. The eMachine is operated in a generator mode to generate electricity that is stored in the energy storage system. The hybrid module can also be used to utilize regenerative braking (i.e., regenerative charging). During regenerative braking, the engine's clutch is disengaged, and the eMachine operates as a generator to supply electricity to the energy storage system. The system is also designed for engine compression braking, in which case the engine's clutch is engaged, and the eMachine operates as a generator as well.

In addition, the system is also designed to utilize both power takeoff (PTO) and electronic PTO (ePTO) modes in order to operate ancillary equipment such as cranes, refrigeration systems, hydraulic lifts, and the like. In a normal PTO mode, the clutch and the PTO system are engaged, and the internal combustion engine is then used to power the ancillary equipment. In an ePTO state, the clutch is disengaged and the eMachine acts as a motor to power the ancillary equipment via the PTO. While in the PTO or ePTO operational modes, the transmission can be in neutral or in gear, depending on the requirements.

Two of the structural considerations important in the design and construction of a hybrid module (transmission) for a hybrid electric vehicle are size and weight. A third factor, reduced cost, usually accompanies reduced size and weight. As the design of the hydraulic system is evaluated, it is important to consider how certain operating techniques, such as multiplexing, might be used to reduce the size, weight and cost associated with the hybrid module. If additional performance benefits can be derived in the process, then there are further advantages to be realized. As disclosed herein. The described hydraulic system for a hybrid module uses existing hydraulic components in a novel manner to provide unique pressure schedules based on torque.

A reduced pressure schedule based on torque should result in reduced spin losses (improves fuel economy) and increased cooler flow (improves reliability). One of the design characteristics related to achieving these results is the multiplexing of solenoids and valves. By not needing to add components, there is no significant increase in size, weight or cost for this technology. Even if selected solenoids and valves have certain design changes for the required flow connections, any increase in size, weight or cost is considered to be minimal.

Further forms, objects, features, aspects, benefits, advantages, and embodiments of the present invention will become apparent from a detailed description and drawings provided herewith.

DETAILED DESCRIPTION

Figure 1:
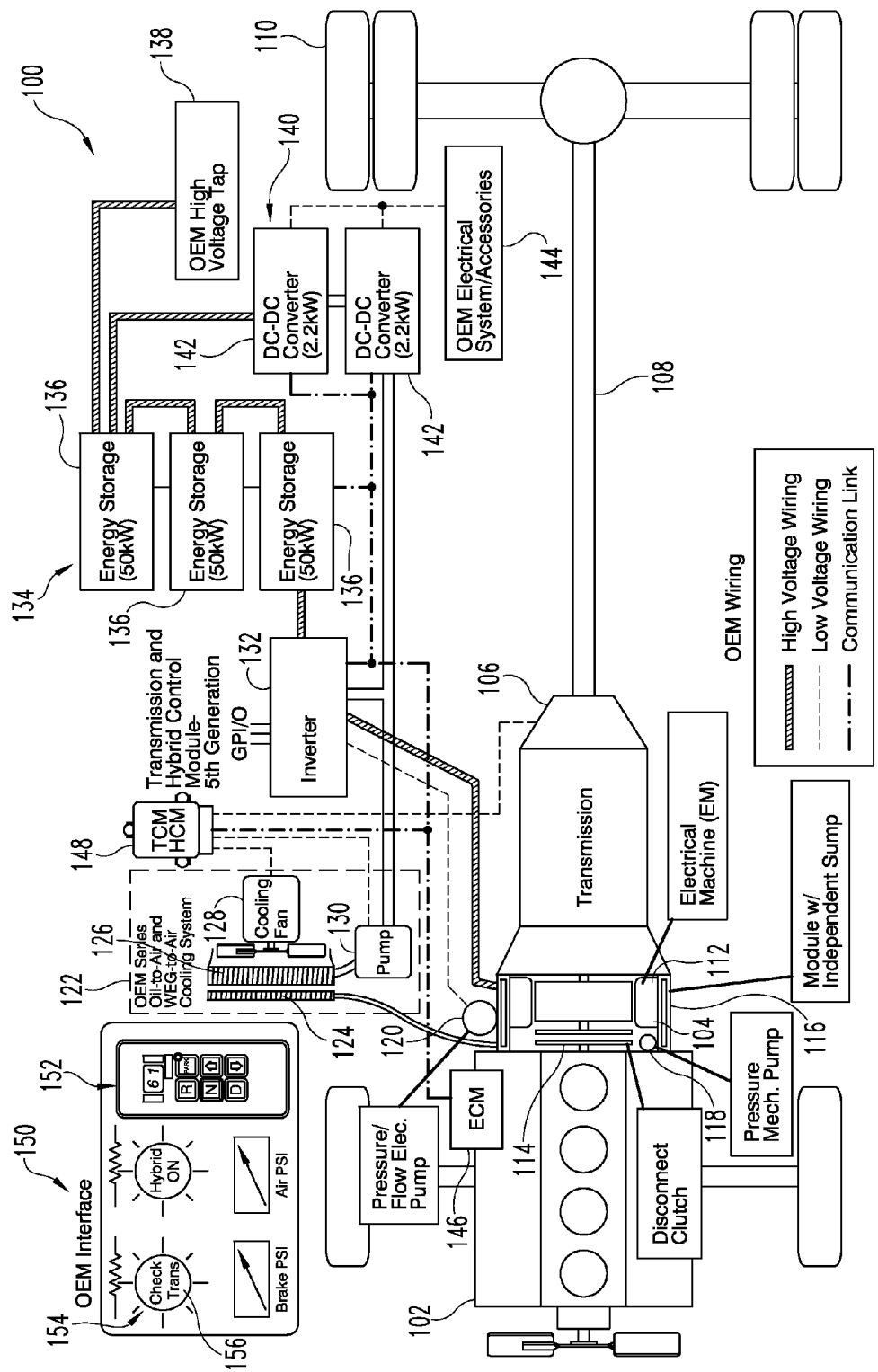
FIG. 1 is a diagrammatic illustration of one example of a hybrid system.

For the purposes of promoting an understanding of the disclosure, reference will now be made to the embodiments illustrated in the drawings and specific language will be used to describe the same. It will nevertheless be understood that no limitation of the scope of the disclosure is thereby intended, such alterations and further modifications in the illustrated device and its use, and such further applications of the principles of the disclosure as illustrated therein being contemplated as would normally occur to one skilled in the art to which the disclosure relates.

FIG. 1 shows a diagrammatic view of a hybrid system 100 according to one embodiment. The hybrid system 100 illustrated in FIG. 1 is adapted for use in commercial-grade trucks as well as other types of vehicles or transportation systems, but it is envisioned that various aspects of the hybrid system 100 can be incorporated into other environments. As shown, the hybrid system 100 includes an engine 102, a hybrid module 104, an automatic transmission 106, and a drive train 108 for transferring power from the transmission 106 to wheels 110. The hybrid module 104 incorporates an electrical machine, commonly referred to as an eMachine 112, and a clutch 114 that operatively connects and disconnects the engine 102 with the eMachine 112 and the transmission 106.

The hybrid module 104 is designed to operate as a self-sufficient unit, that is, it is generally able to operate independently of the engine 102 and transmission 106. In particular, its hydraulics, cooling and lubrication do not directly rely upon the engine 102 and the transmission 106. The hybrid module 104 includes a sump 116 that stores and supplies fluids, such as oil, lubricants, or other fluids, to the hybrid module 104 for hydraulics, lubrication, and cooling purposes. While the terms oil or lubricant or lube will be used interchangeably herein, these terms are used in a broader sense to include various types of lubricants, such as natural or synthetic oils, as well as lubricants having different properties. To circulate the fluid, the hybrid module 104 includes a mechanical pump 118 and an electric pump 120 in cooperation with a hydraulic system 200 (see FIG. 2). With this parallel combination of both the mechanical pump 118 and electric pump 120, the overall size is reduced. The electric pump 120 cooperates with the mechanical pump 118 to provide extra pumping capacity when required. The electric pump 120 is also used for hybrid system needs when there is no drive input to operate the mechanical pump 118. In addition, it is contemplated that the flow through the electric pump 120 can be used to detect low fluid conditions for the hybrid module 104.

The hybrid system 100 further includes a cooling system 122 that is used to cool the fluid supplied to the hybrid module 104 as well as the water-ethylene-glycol (WEG) to various other components of the hybrid system 100. In one variation, the WEG can also be circulated through an outer jacket of the eMachine 112 in order to cool the eMachine 112. Although the hybrid system 100 has been described with respect to a WEG coolant, other types of antifreezes and cooling fluids, such as water, alcohol solutions, etc., can be used. With continued reference to FIG. 1, the cooling system 122 includes a fluid radiator 124 that cools the fluid for the hybrid module 104. The cooling system 122 further includes a main radiator 126 that is configured to cool the antifreeze for various other components in the hybrid system 100. Usually, the main radiator 126 is the engine radiator in most vehicles, but the main radiator 126 does not need to be the engine radiator. A cooling fan 128 flows air through both fluid radiator 124 and main radiator 126. A circulating or coolant pump 130 circulates the antifreeze to the main radiator 126. It should be recognized that other various components besides the ones illustrated can be cooled using the cooling system 122. For instance, the transmission 106 and/or the engine 102 can be cooled as well via the cooling system 122.

The eMachine 112 in the hybrid module 104, depending on the operational mode, at times acts as a generator and at other times as a motor. When acting as a motor, the eMachine 112 draws alternating current (AC). When acting as a generator, the eMachine 112 creates AC. An inverter 132 converts the AC from the eMachine 112 and supplies it to an energy storage system 134. In the illustrated example, the energy storage system 134 stores the energy and resupplies it as direct current (DC). When the eMachine 112 in the hybrid module 104 acts as a motor, the inverter 132 converts the DC power to AC, which in turn is supplied to the eMachine 112. The energy storage system 134 in the illustrated example includes three energy storage modules 136 that are daisy-chained together to supply high voltage power to the inverter 132. The energy storage modules 136 are, in essence, electrochemical batteries for storing the energy generated by the eMachine 112 and rapidly supplying the energy back to the eMachine 112. The energy storage modules 136, the inverter 132, and the eMachine 112 are operatively coupled together through high voltage wiring as is depicted by the line illustrated in FIG. 1. While the illustrated example shows the energy storage system 134 including three energy storage modules 136, it should be recognized that the energy storage system 134 can include more or less energy storage modules 136 than is shown. Moreover, it is envisioned that the energy storage system 134 can include any system for storing potential energy, such as through chemical means, pneumatic accumulators, hydraulic accumulators, springs, thermal storage systems, flywheels, gravitational devices, and capacitors, to name just a few examples.

High voltage wiring connects the energy storage system 134 to a high voltage tap 138. The high voltage tap 138 supplies high voltage to various components attached to the vehicle. A DC-DC converter system 140, which includes one or more DC-DC converter modules 142, converts the high voltage power supplied by the energy storage system 134 to a lower voltage, which in turn is supplied to various systems and accessories 144 that require lower voltages. As illustrated in FIG. 1, low voltage wiring connects the DC-DC converter modules 142 to the low voltage systems and accessories 144.

The hybrid system 100 incorporates a number of control systems for controlling the operations of the various components. For example, the engine 102 has an engine control module (ECM) 146 that controls various operational characteristics of the engine 102 such as fuel injection and the like. A transmission/hybrid control module (TCM/HCM) 148 substitutes for a traditional transmission control module and is designed to control both the operation of the transmission 106 as well as the hybrid module 104. The transmission/hybrid control module 148 and the engine control module 146 along with the inverter 132, energy storage system 134, and DC-DC converter system 140 communicate along a communication link as is depicted in FIG. 1.

To control and monitor the operation of the hybrid system 100, the hybrid system 100 includes an interface 150. The interface 150 includes a shift selector 152 for selecting whether the vehicle is in drive, neutral, reverse, etc., and an instrument panel 154 that includes various indicators 156 of the operational status of the hybrid system 100, such as check transmission, brake pressure, and air pressure indicators, to name just a few.

As noted before, the hybrid system 100 is configured to be readily retrofitted to existing vehicle designs with minimal impact to the overall design. All of the systems including, but not limited to, mechanical, electrical, cooling, controls, and hydraulic systems, of the hybrid system 100 have been configured to be a generally self-contained unit such that the remaining components of the vehicle do not need significant modifications. The more components that need to be modified, the more vehicle design effort and testing is required, which in turn reduces the chance of vehicle manufacturers adopting newer hybrid designs over less efficient, preexisting vehicle designs. In other words, significant modifications to the layout of a preexisting vehicle design for a hybrid retrofit require, then, vehicle and product line modifications and expensive testing to ensure the proper operation and safety of the vehicle, and this expense tends to lessen or slow the adoption of hybrid systems. As will be recognized, the hybrid system 100 not only incorporates a mechanical architecture that minimally impacts the mechanical systems of pre-existing vehicle designs, but the hybrid system 100 also incorporates a control/electrical architecture that minimally impacts the control and electrical systems of pre-existing vehicle designs.

Figure 2:
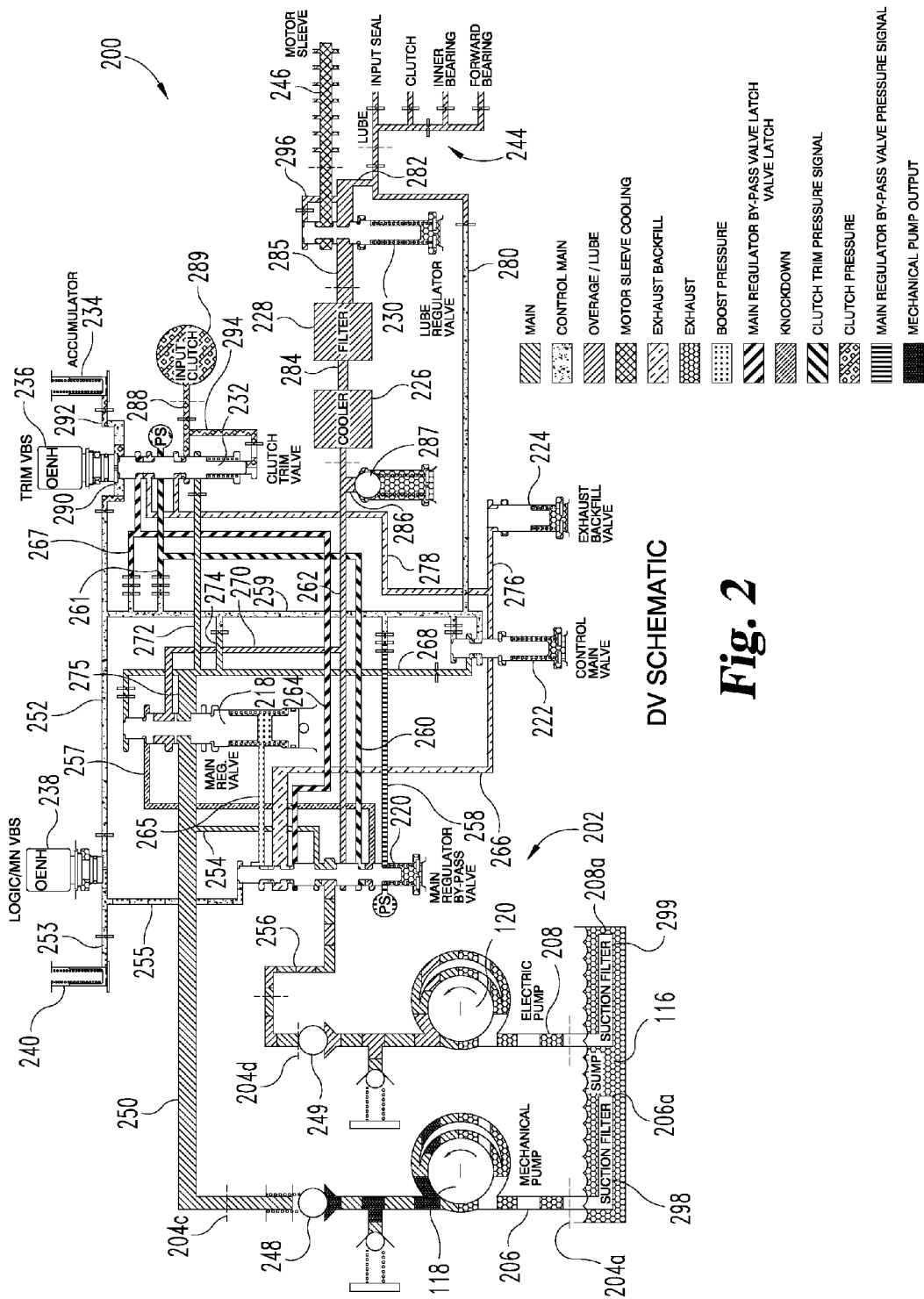
FIG. 2 is a diagrammatic illustration of one hydraulic system suitable for use in the FIG. 1 hybrid system.
Figure 2A:
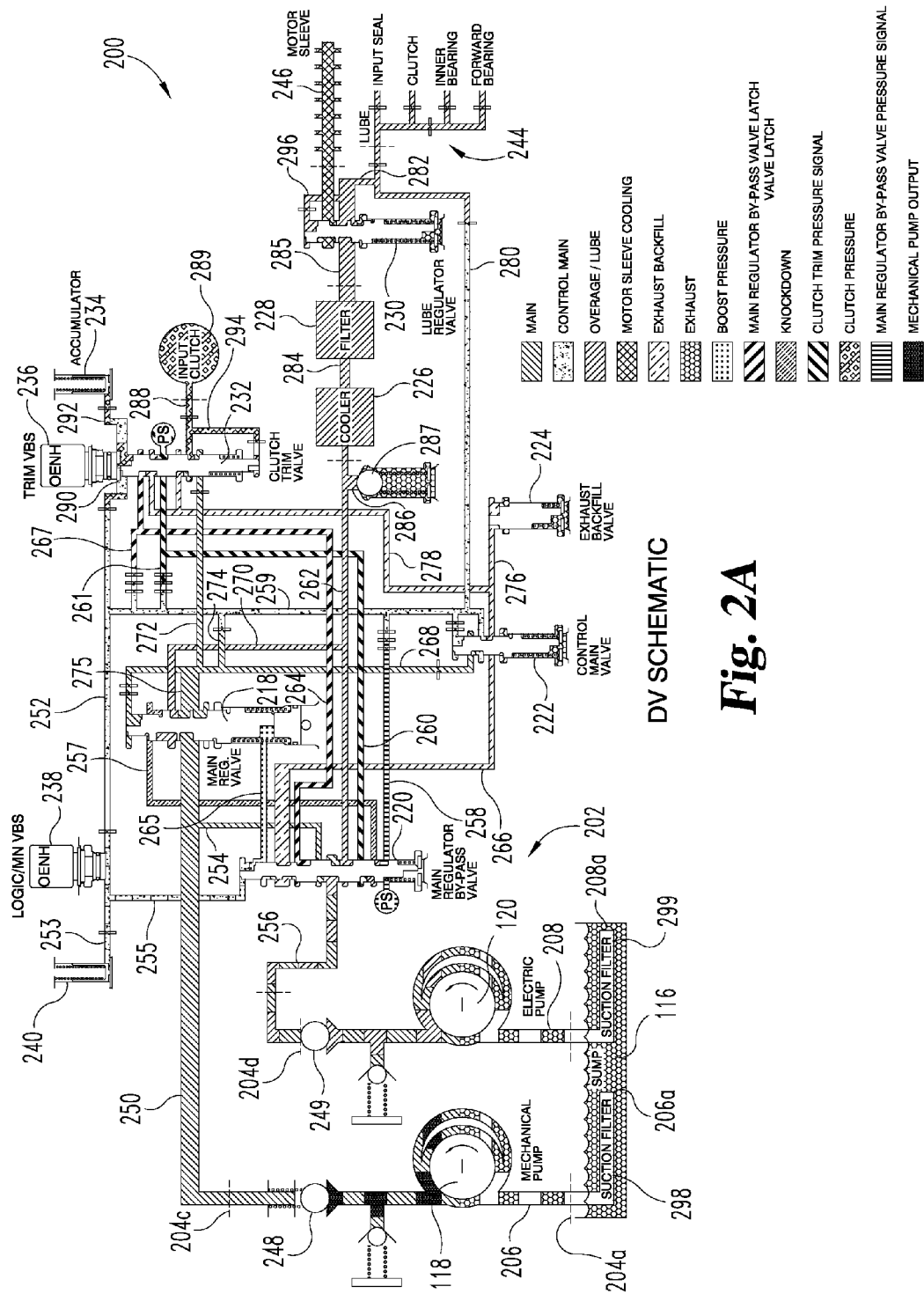
FIG. 2A is a diagrammatic illustration of the FIG. 2 hydraulic system as a "split-valve" illustration.

Referring to FIGS. 2 and 2A, there is illustrated in diagrammatic form a hydraulic system 200 which is suitably constructed and arranged for use with hybrid system 100. More particularly, hydraulic system 200 is a portion of hybrid module 104. Since the FIGS. 2 and 2A illustrations include components which interface with a sump module assembly 202, broken lines 204 are used in FIGS. 2 and 2A to denote, in diagrammatic form, the functional locations of the oil connections from other hydraulic components to the sump module assembly 202. Lower case letters are used in conjunction with reference numeral 204 in order to distinguish the various broken line locations (204a, 204b, etc.). For example, the sump 116 is part of the sump module assembly 202, while mechanical pump 118 and electric pump 120 may not technically be considered actual component parts of the sump module assembly 202, though this convention is somewhat arbitrary. The mechanical pump 118 and the electric pump 120 each have an oil connection with the sump module assembly 202. Sump 116 is independent of the sump for the automatic transmission 106. Broken line 204a diagrammatically illustrates the location of flow communication between the mechanical pump inlet conduit 206 and sump 116. Similarly, broken line 204b denotes the location of flow communication between the electric pump inlet conduit 208 and sump 116. Inlet conduit 206 defines inlet conduit opening 206a. Inlet conduit 208 defines inlet conduit opening 208a.

The FIG. 2 illustration shows the standard schematic for the hydraulic system 200 with all the valves in the OFF/installed position. The FIG. 2A illustration shows the valves in a "split" configuration with the left side depicting the OFF/installed position. The right side depicts the ON/applied position for each valve. The FIG. 2A illustration is used for the detailed valve illustrations of FIGS. 3-8. The same hydraulic system reference number (200) is used for both illustrations as the structures are the same.

With continued reference to FIGS. 2 and 2A, on the flow exiting sides of the two oil pumps, broken line 204c denotes the location where the outlet 210 of mechanical pump 118 is in flow connection (and flow communication) with the sump module assembly 202. Broken line 204d denotes the location where the outlet 212 of the electric pump 120 is in flow connection (and flow communication) with the sump module assembly 202. This broken line convention is used throughout the FIG. 2 illustration and is used in FIG. 2A. However, this convention is simply for convenience in explaining the exemplary embodiment and is not intended to be structurally limiting in any manner. While the other components which have flow connections to the sump module assembly 202 are not technically considered part of the sump module assembly, these other components, such as the mechanical pump 118 and the electric pump 120, are considered part of the overall hydraulic system 200. Still, this convention of what components are part of what systems or subsystems remains somewhat arbitrary.

With continued referenced to FIGS. 2 and 2A, hydraulic system 200 includes a main regulator valve 218, main regulator by-pass valve 220, control main valve 222, exhaust back fill valve 224, cooler 226, filter 228, lube regulator valve 230 (also referred to as a lube splitter valve), clutch trim valve 232, accumulator 234, solenoid 236, solenoid 238 and accumulator 240. It will be appreciated that these identified component parts and subassemblies of hydraulic system 200 are connected with various flow conduits and that pop off valves are strategically positioned to safeguard against excessive pressure levels. Further, downstream from the lube regulator valve 230 are illustrated elements which are intended to receive oil. The first priority of the available oil at the lube regulator valve 230 is for lubrication and cooling of bearings 244 and gears or other accessories which are in need of cooling and lubrication. The second priority, once the first priority has been satisfied, is to deliver oil to motor sleeve 246.

The mechanical pump 118 is constructed and arranged to deliver oil to the main regulator valve 218 via conduit 250.

One-way valve 248 is constructed and arranged for flow communication with conduit 250 and is positioned downstream from the mechanical pump 118. Valve 248 is constructed and arranged to prevent backwards flow when the engine and (accordingly) the mechanical pump are OFF. Valve 248 includes a ball and spring arrangement set at a threshold of 5 psi. Branch conduit 254 provides a flow connection from conduit 250 to the main regulator by-pass valve 220. The electric pump 120 is constructed and arranged to deliver oil to the main regulator by-pass valve 220 via conduit 256.

The main regulator valve 218, main regulator by-pass valve 220, control main valve 222, exhaust backfill valve 224, lube regulator valve 230, and clutch trim valve 232 each have a construction and arrangement which is best described, based on its construction and functionality, as a "spool valve". Each valve includes a valve body which defines an interior valve bore. Each valve also includes the use of a valve spool which is slidably disposed within the valve bore of the valve body. The selected cylindrical lands can be varied by diameter size, axial height, spacing, and relative location along the axis of the valve spool. The valve bore can also include sections with different diameters. Flow passages defined by the valve body connect to the various conduits, providing a predetermined and preselected arrangement of flow inputs and outputs, depending on incoming pressure levels and the positioning of the valve spool relative to the various flow passages.

In one style of spool valve, the valve spool acts against a biasing spring disposed at one end of the valve body. In another style (push-pull) fluid connections are provided at each end of the valve body. Pressurized fluid at one end with an exhaust or drain back at the opposite end moves the valve spool based on the pressure difference. One key to the particular style or construction is the number, spacing, axial height and diameter of each land of the spool valve. Another key to the particular style or construction is the number and location of the work ports which provide fluid communication. A more detailed description of this type of spool valve is provided in U.S. Pat. Nos. 7,392,892; 7,150,288; and 5,911,244. These three U.S. patent references are hereby incorporated by reference in their entirety as background technical information on the style and type of valve being used.

Figure 3:
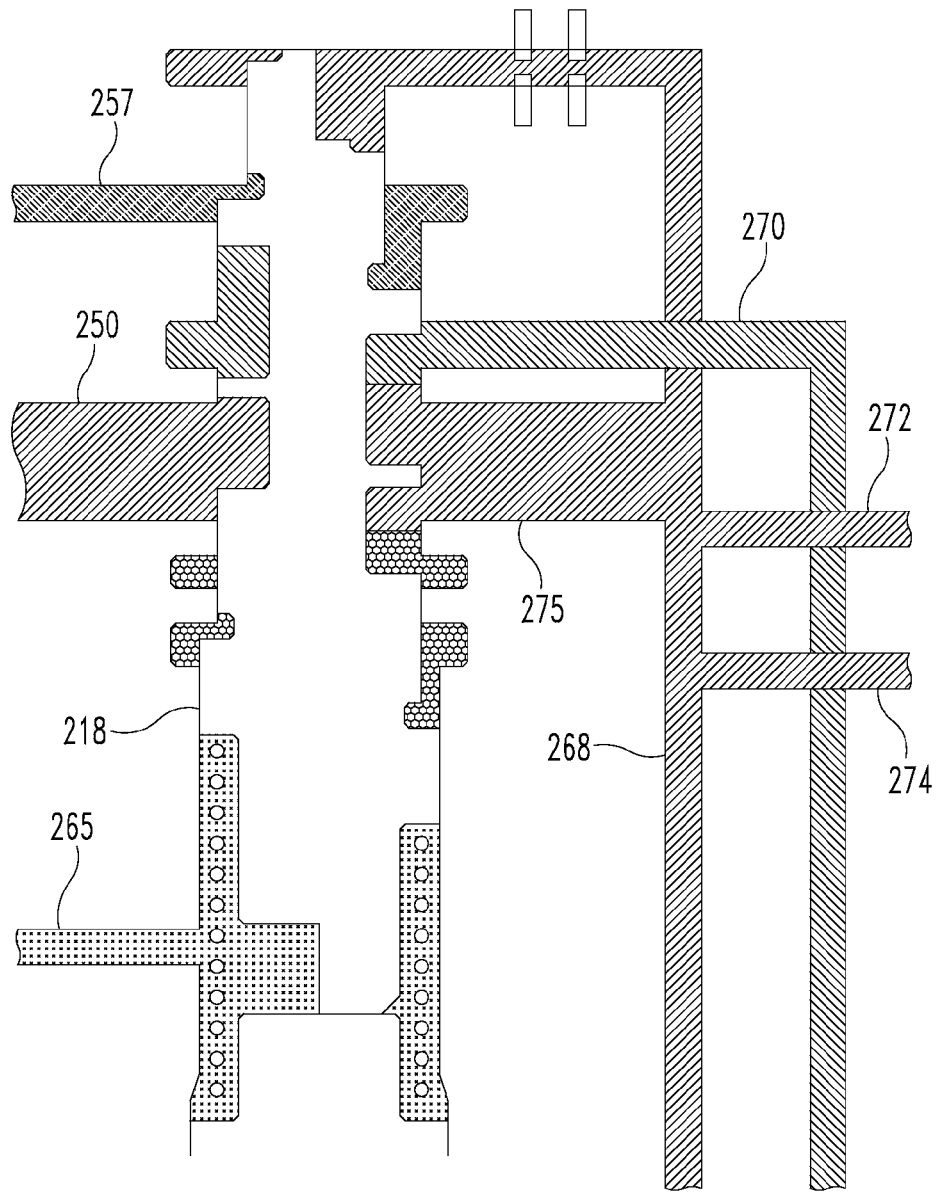
FIG. 3 is a diagrammatic, front elevational view, in partial cross-section, of a main regulator valve which comprises one portion of the FIG. 2 hydraulic system.
Figure 3A:
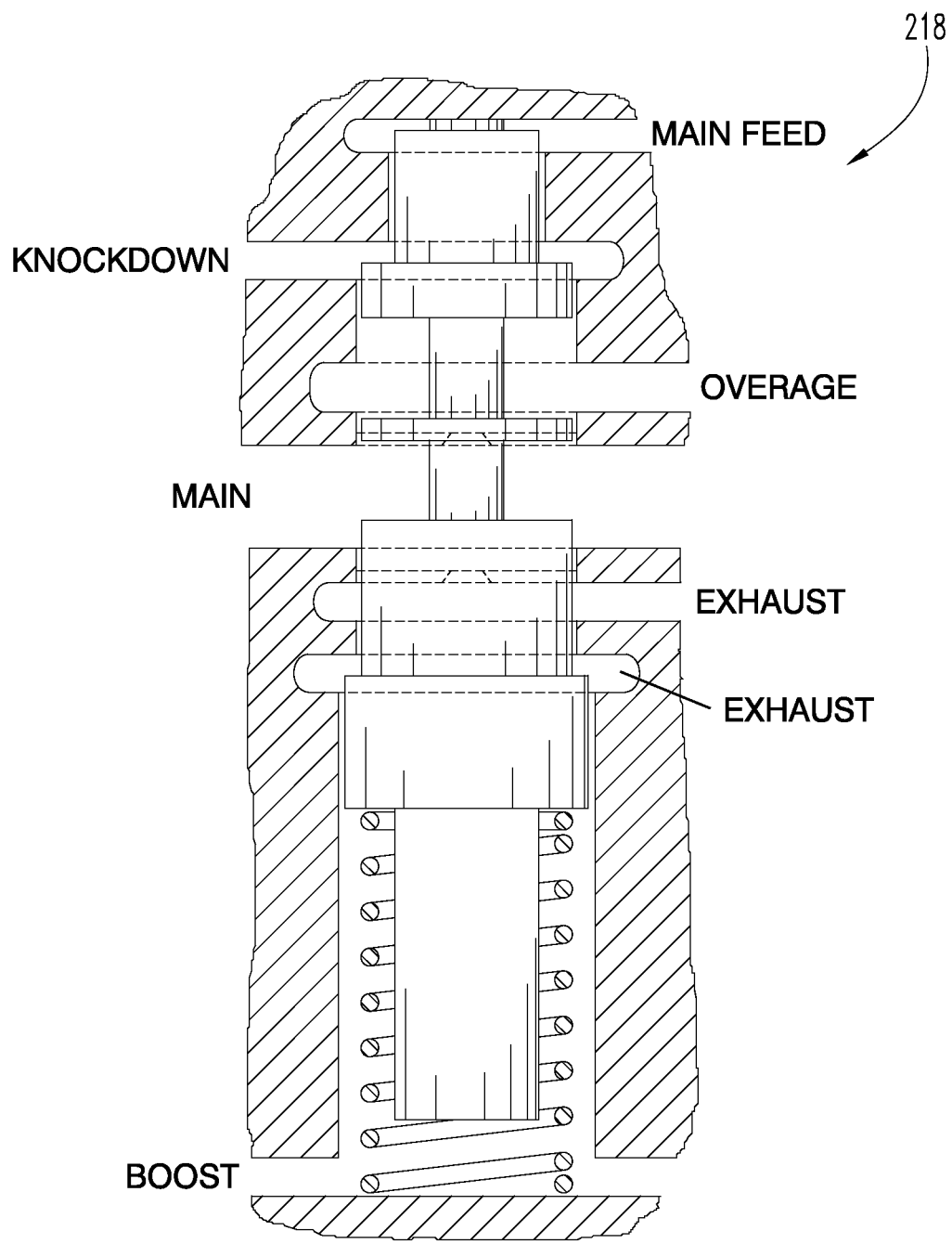
FIG. 3A is a schematic illustration of the interior construction of the FIG. 3 main regulator valve.
Figure 4:
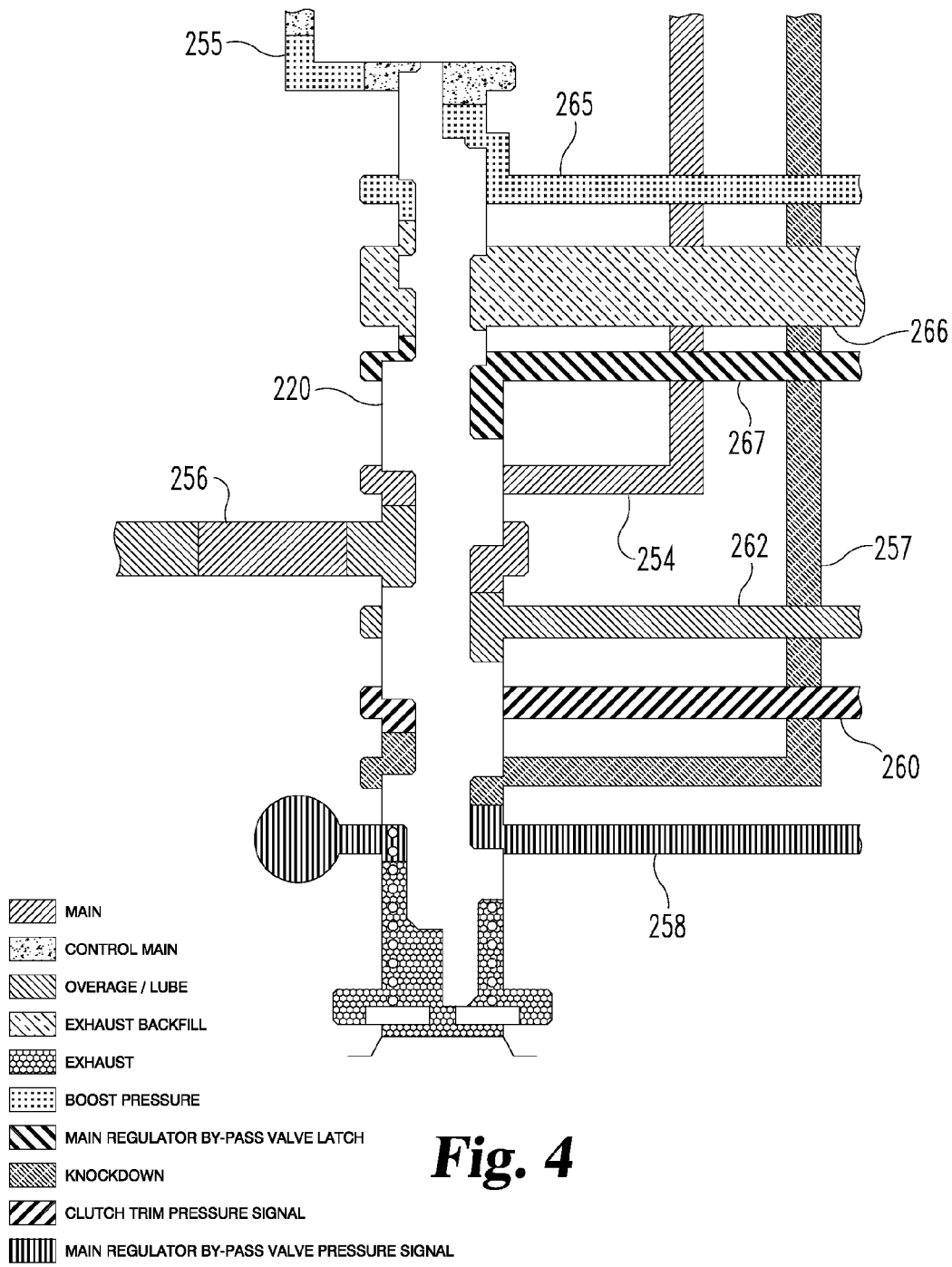
FIG. 4 is a diagrammatic, front elevational view, in partial cross-section, of a main regulator by-pass valve which comprises one portion of the FIG. 2 hydraulic system.
Figure 4A:
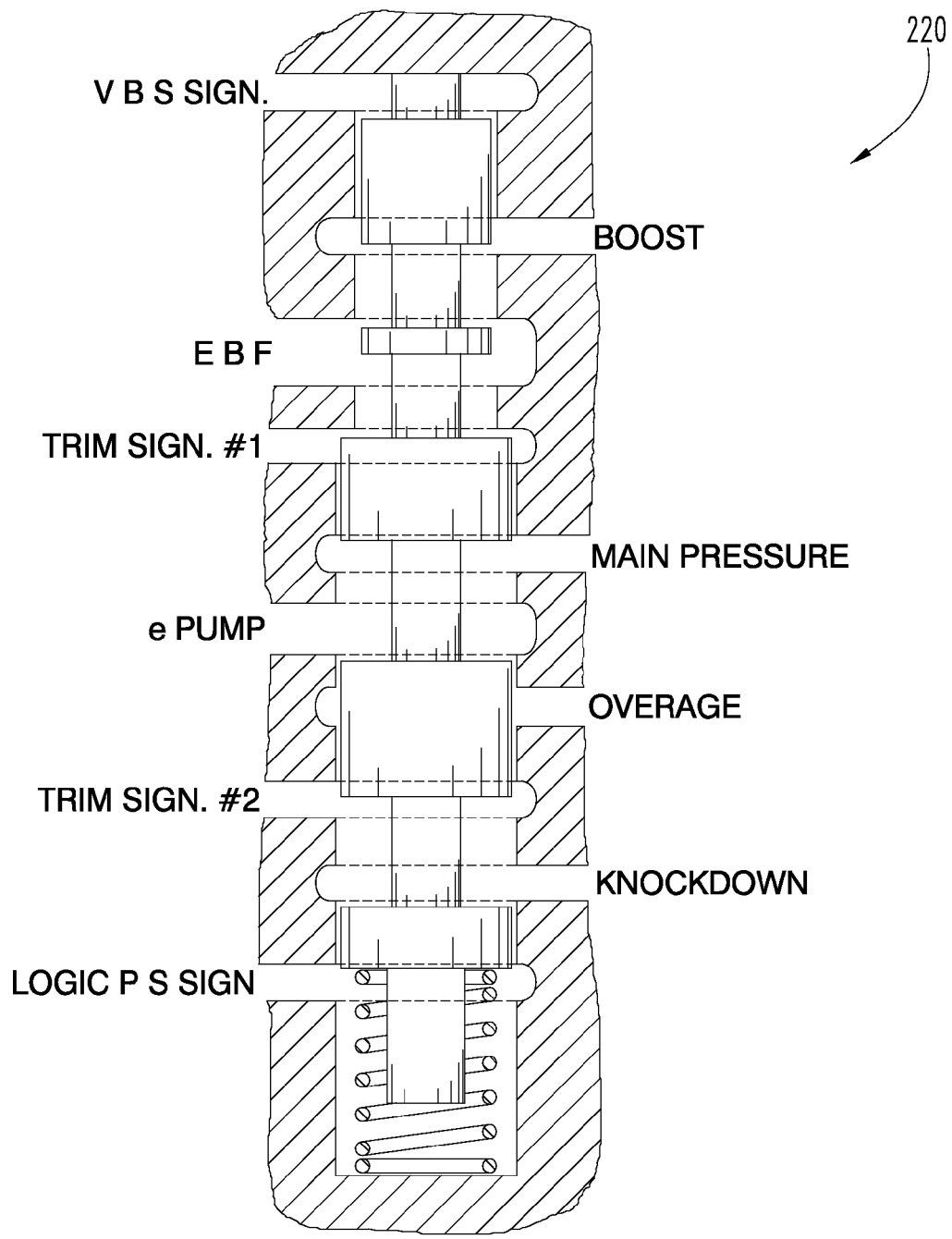
FIG. 4A is a schematic illustration of the interior construction of the FIG. 4 main regulator by-pass valve.
Figure 5:
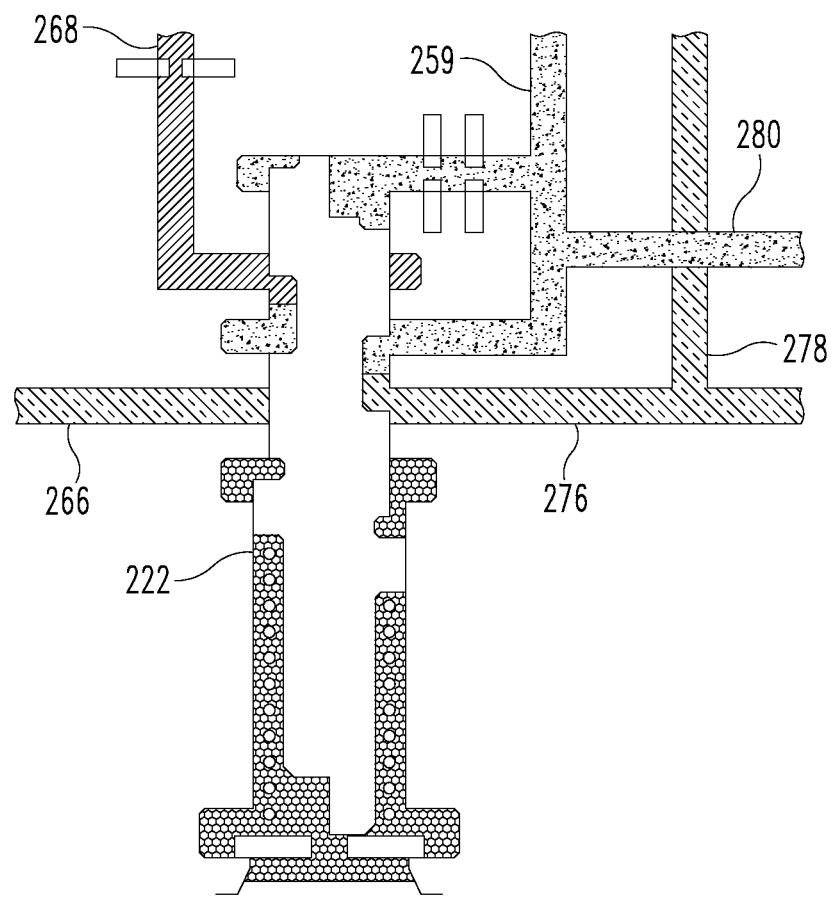
FIG. 5 is a diagrammatic, front elevational view, in partial cross-section, of a control main valve which comprises one portion of the FIG. 2 hydraulic system.
Figure 5A:
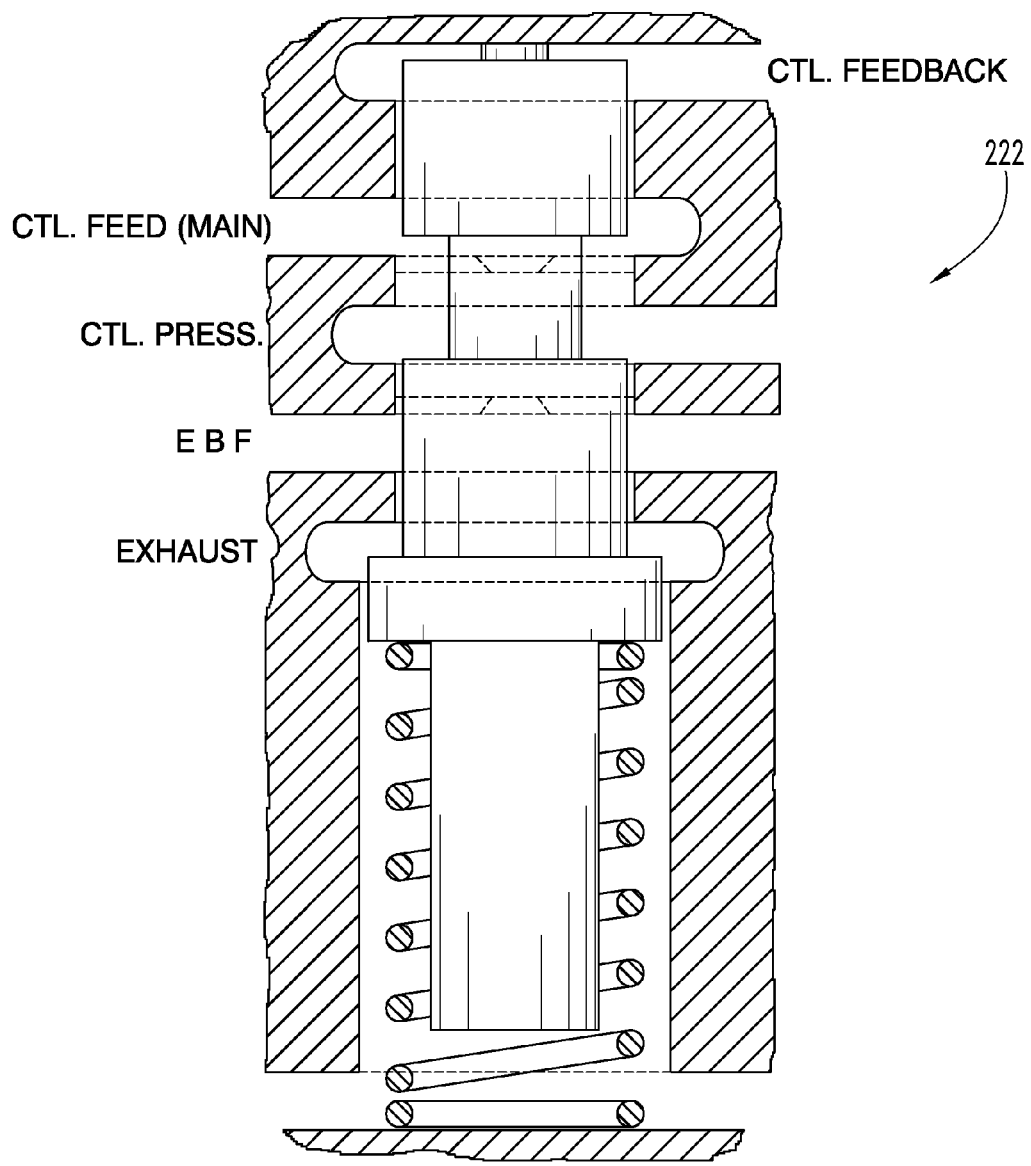
FIG. 5A is a schematic illustration of the interior construction of the FIG. 5 control main valve.
Figure 6:
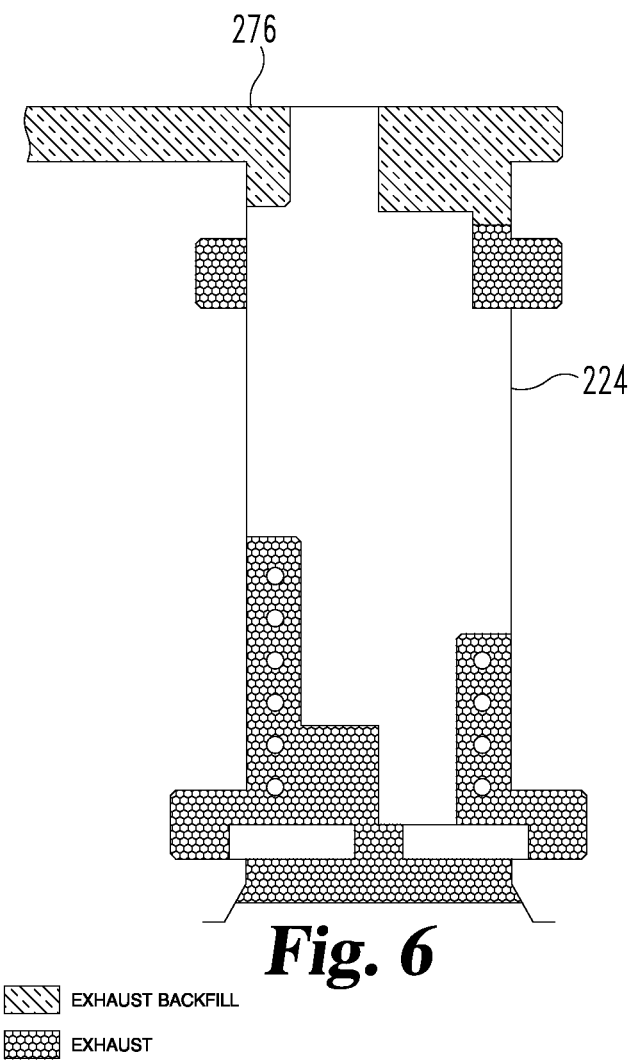
FIG. 6 is a diagrammatic, front elevational view, in partial cross-section, of a exhaust backfill valve which comprises one portion of the FIG. 2 hydraulic system.
Figure 6A:
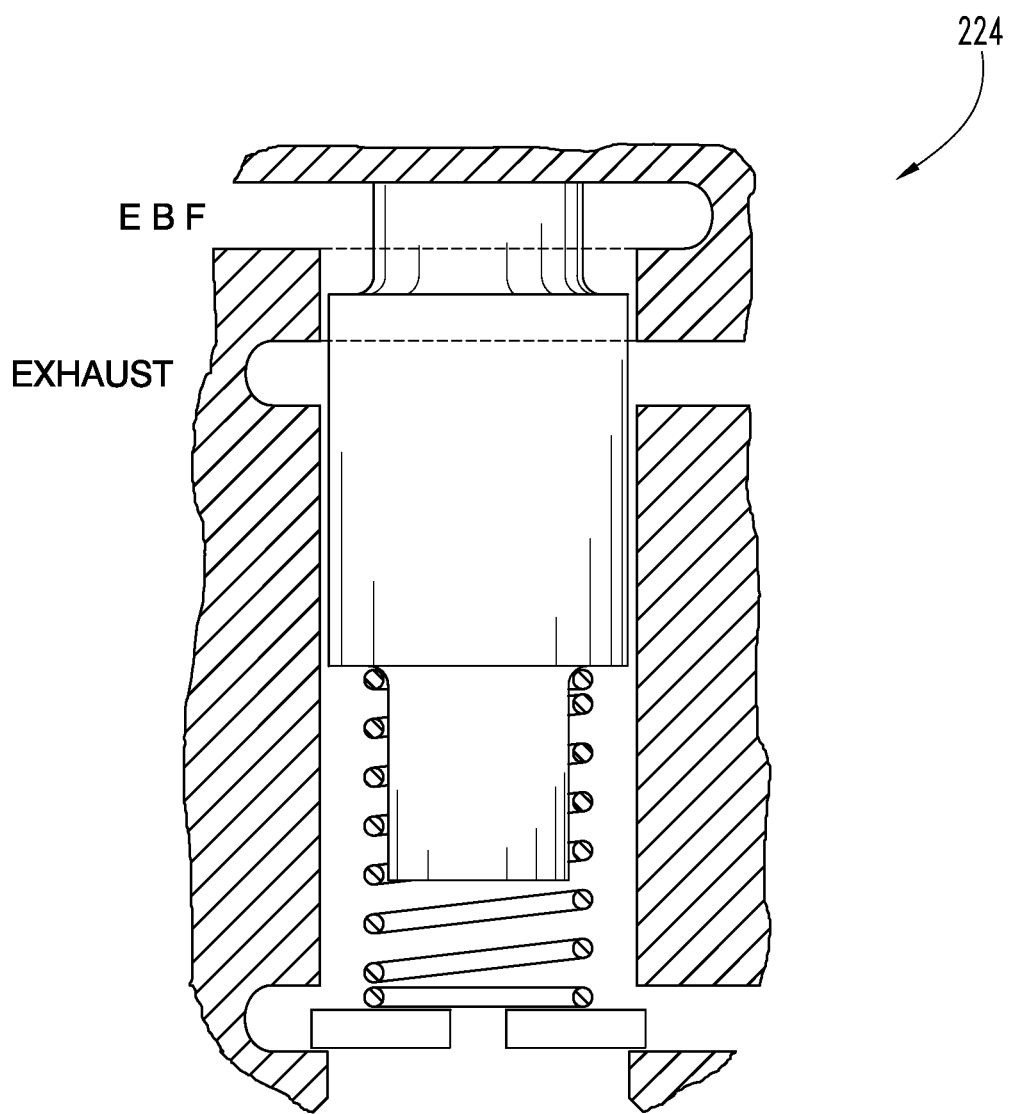
FIG. 6A is a schematic illustration of the interior construction of the FIG. 6 exhaust backfill valve.
Figure 7:
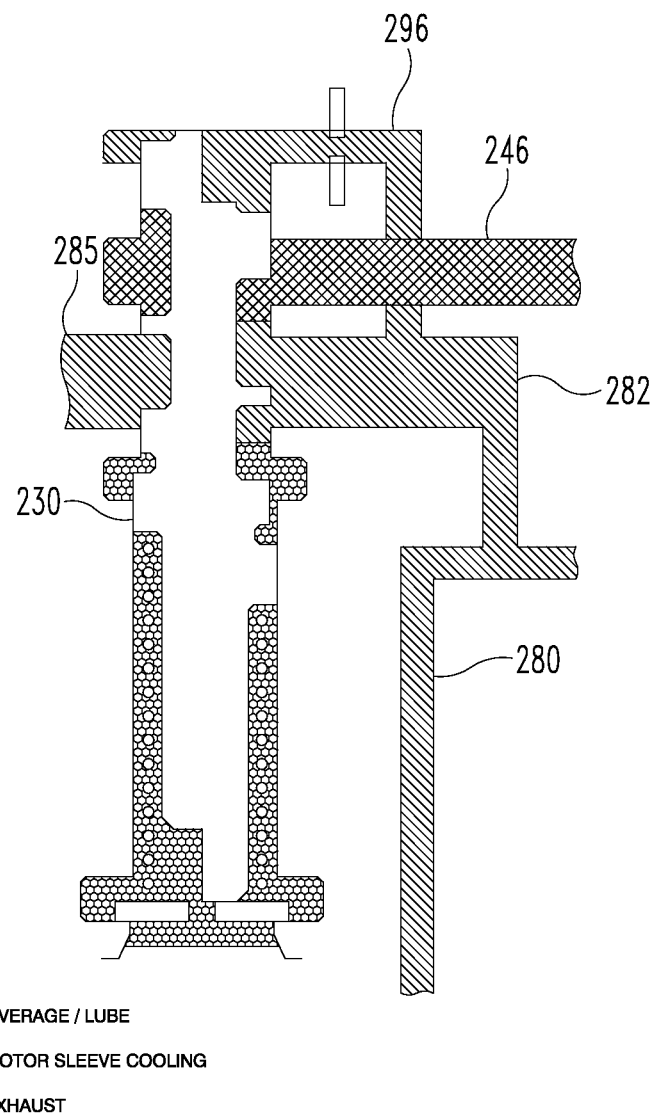
FIG. 7 is a diagrammatic, front elevational view, in partial cross-section, of a lube regulator valve which comprises one portion of the FIG. 2 hydraulic system.
Figure 7A:
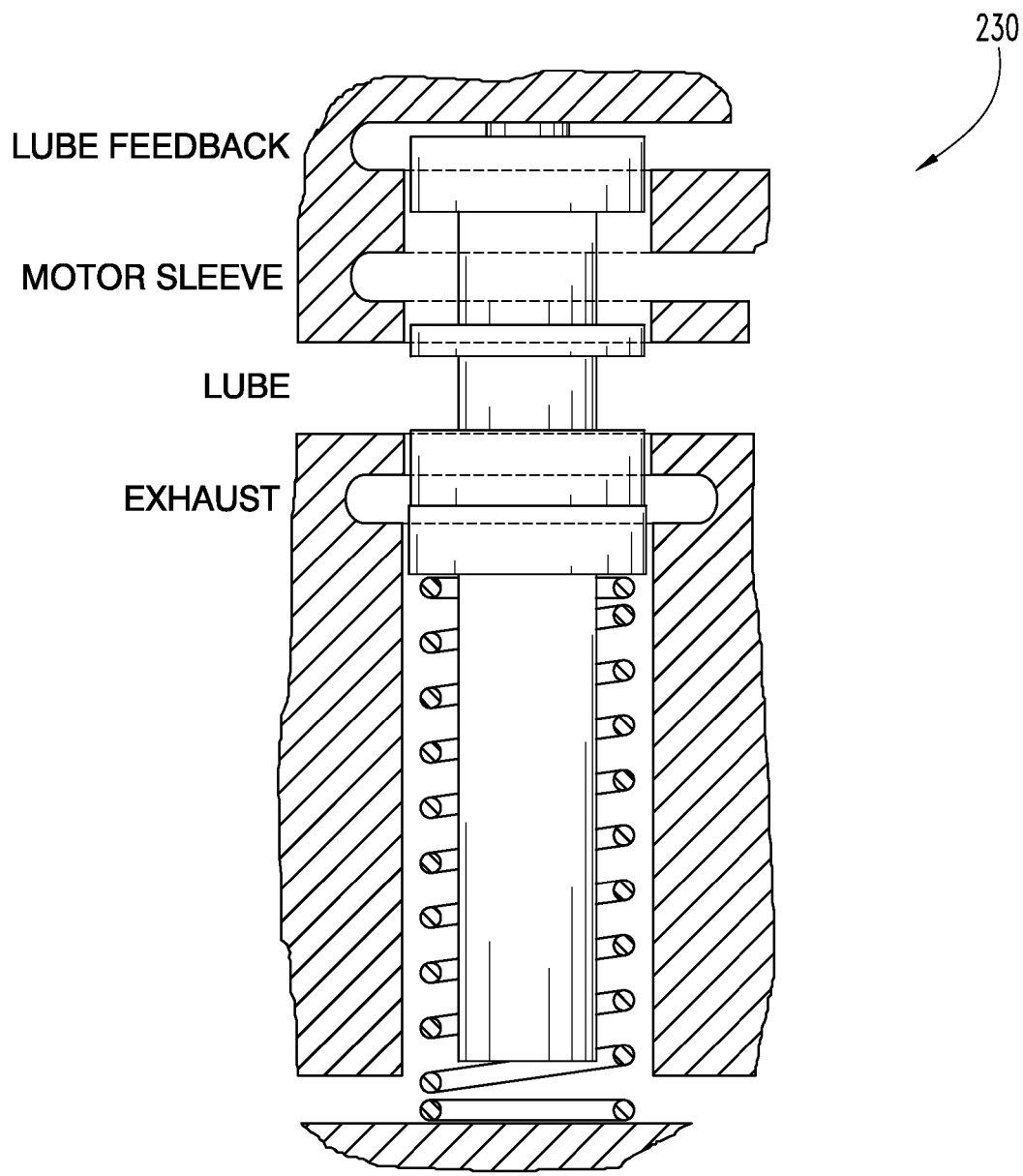
FIG. 7A is a schematic illustration of the interior construction of the FIG. 7 lube regulator valve.
Figure 8:
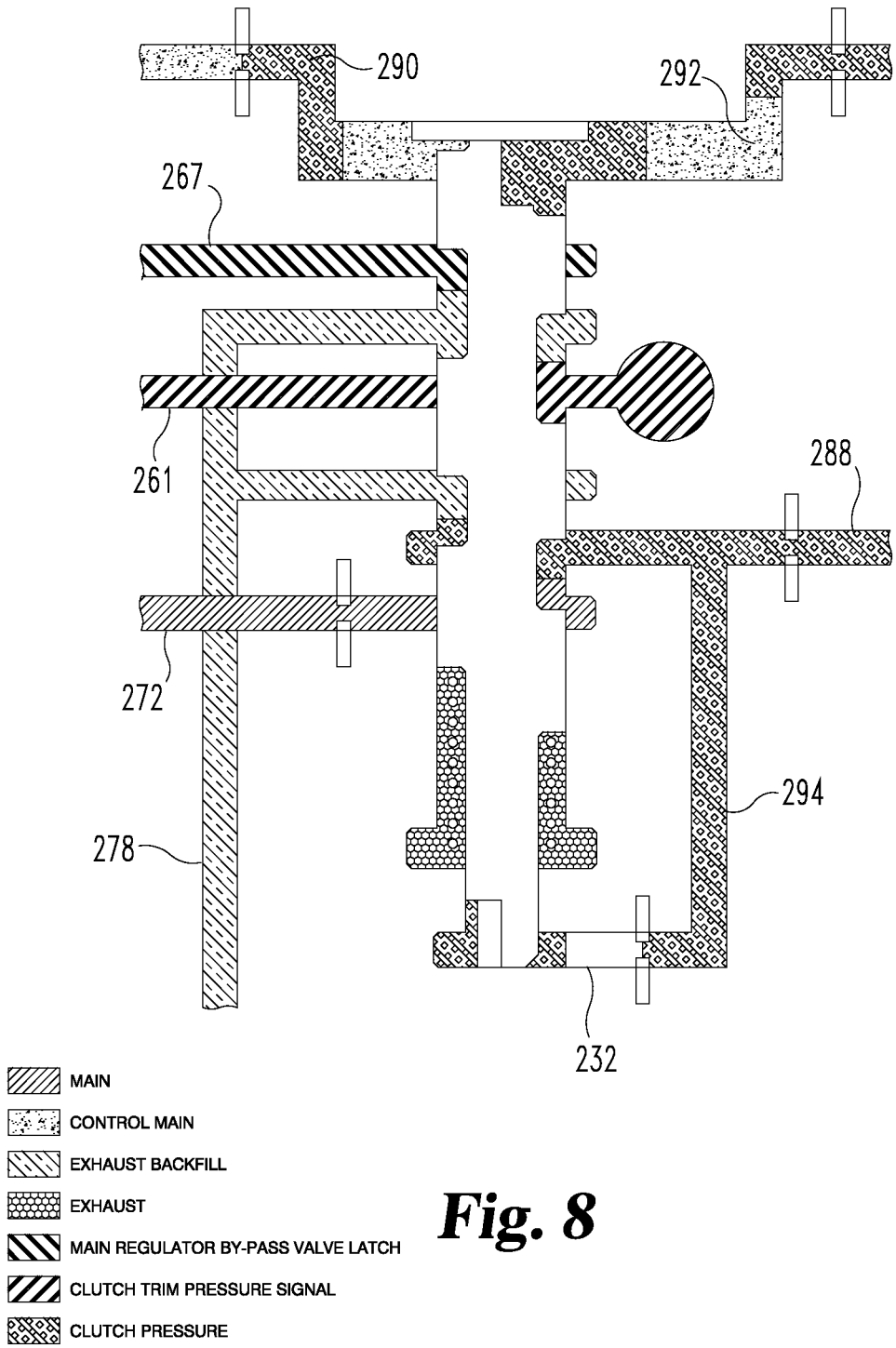
FIG. 8 is a diagrammatic, front elevational view, in partial cross-section, of a clutch trim valve which comprises one portion of the FIG. 2 hydraulic system.
Figure 8A:
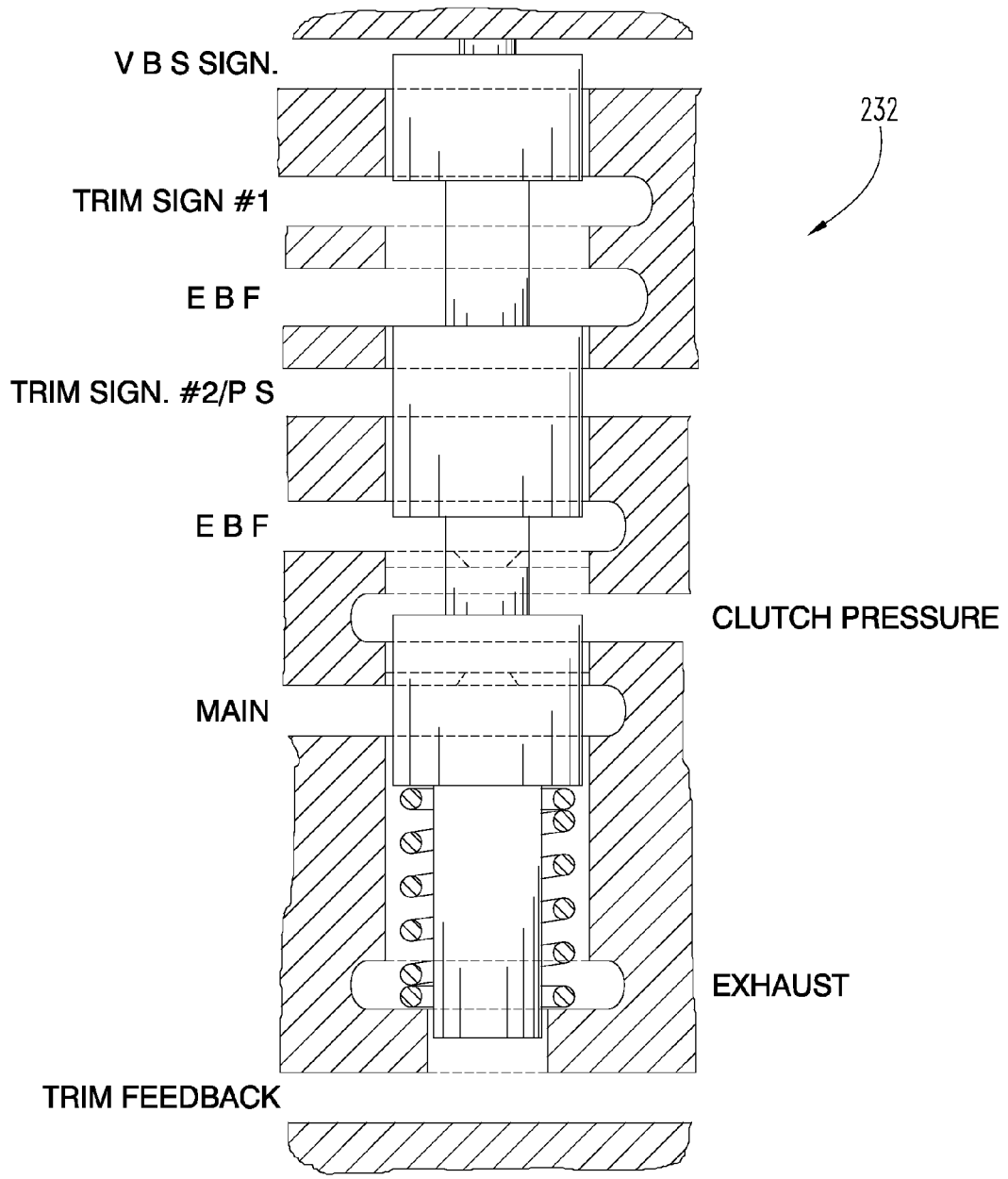
FIG. 8A is a schematic illustration of the interior construction of the FIG. 3 clutch trim valve.

A partial, diagrammatic view of each of the six identified valves is provided by FIGS. 3-8. The details of each valve in terms of its flow connections and the interconnecting fluid passages and conduits are described below. Described are the defined work ports for each valve in terms of the interconnecting conduits of hydraulic system 200. As is illustrated in FIGS. 3-8 and as based in part on FIGS. 2 and 2A, the various interconnecting conduits of hydraulic system 200 are in flow communication with selected work ports of these six valves. This is further described in the context of the description of each valve. A schematic, cross-sectional illustration of the six valves of FIGS. 3-8 is presented by FIGS. 3A-8A, respectively. The FIG. 4 illustration uses the acronym HMEC which stands for hybrid module engine clutch.

Considering the diagrammatic form of FIGS. 2 and 2A, it will be appreciated that the various flow connections and flow conduits may assume any one of a variety of forms and constructions so long as the desired oil flow can be achieved with the desired flow rate and the desired flow timing and sequence. The hydraulic system 200 description makes clear what type of oil flow is required between what components and subassemblies and the operational reason for each flow path. The hydraulic system 200 description which corresponds to what is illustrated in FIGS. 2 and 2A is directed to what components and subassemblies are in oil flow communication with each other, depending on the hybrid system 100 conditions and the operational mode.

With continued to reference to FIGS. 2 and 2A and the various flow conduits which are illustrated, it will be noted that there are both "point-to-point" flow conduits and 'point-to-conduit" flow conduits. There are a few flow conduit paths and connections which might be considered something of a "hybrid" of these two primary categories of flow conduit connections, as one would be able to recognize from the FIGS. 2 and 2A illustrations. A "point-to-point" flow conduit extends between two components, such as a pump, valve, solenoid, etc. A "point-to-conduit" flow conduit intersects another flow conduit and is flow coupled to a component. Table I as set forth below lists each flow conduit which is illustrated in FIGS. 2 and 2A.

The first column of Table I provides the reference number of the flow conduit. The second and third columns provide the reference numbers of the end points for that particular flow conduit. It is probably better or at least preferable to refer to the endpoints of each flow conduit rather than referring to the beginning and ending points as that might suggest a particular flow direction which would not necessarily be the case in every mode. In the event of any reverse or back flow terms such as "beginning" and "ending" become only relative terms. For this reason, the second and third columns of Table I should simply be understood as end points for the corresponding flow conduit.

Reference numbers 218, 220, 222, 224, 230 and 232 as used in FIGS. 2 and 2A and as listed in Table I, identify they hydraulic spool valves. Reference numbers 248, 249 and 287 identify one-way valves. Other non-conduit reference numbers as listed in Table I include solenoids 236 and 238, accumulators 234 and 240, cooler 226, filter 228, input clutch 289 and bearings 244. All other reference numbers in Table I identify a flow conduit of FIGS. 2 and 2A.

TABLE I

| Conduit | End Point | End Point |
|---|---|---|
| 250 | 248 | 218 |
| 252 | 238 | 236 |
| 253 | 240 | 238 |
| 254 | 220 | 250 |
| 255 | 220 | 253 |
| 256 | 249 | 220 |
| 257 | 220 | 218 |
| 258 | 220 | 259 |
| 259 | 222 | 252 |
| 260 | 220 | 261 |
| 261 | 259 | 232 |
| 262 | 220 | 226 |
| 264 | 220 | 232 |
| 265 | 220 | 218 |
| 266 | 220 | 222 |
| 267 | 259 | 264 |
| 268 | 218 | 222 |
| 270 | 218 | 262 |
| 272 | 268 | 232 |
| 274 | 268 | 259 |
| 275 | 218 | 268 |
| 276 | 222 | 224 |
| 278 | 276 | 232 |
| 280 | 222 | 244 |
| 282 | 280 | 230 |
| 284 | 226 | 228 |
| 285 | 228 | 230 |
| 286 | 262 | 287 |
| 288 | 232 | 289 |
| 290 | 236 | 232 |
| 292 | 232 | 234 |

TABLE I-continued

| Conduit | End Point | End Point |
|---|---|---|
| 294 | 232 | 288 |
| 296 | 230 | 282 |

Each of the six hydraulic spool valves of FIG. 2A are separately illustrated as enlarged diagrammatic illustrations in FIGS. 3-8. These drawings show the ports and connections of each valve in a manner corresponding to FIG. 2 and consistent with what is set forth in Table I. Corresponding reference numbers for the connecting flow conduits are used. In FIGS. 3A-8A, a schematic illustration, in full section, of each of the six hydraulic spool valves is provided in order to show the interior spool construction of each valve. The FIG. 3A illustration of valve 218 corresponds to the spool valve 218 which is illustrated in FIG. 3. Similarly, FIGS. 4A-8A correspond to FIGS. 4-8, respectively.

Before describing each of the three modes of operation applicable to hydraulic system 200, the relationship between and some of the construction details regarding the mechanical pump 118 and the electric pump 120 will be described. Understanding a few of the pump basics should facilitate a better understanding of the three modes of operation selected for further discussion regarding the overall hydraulic system.

Figure 9:
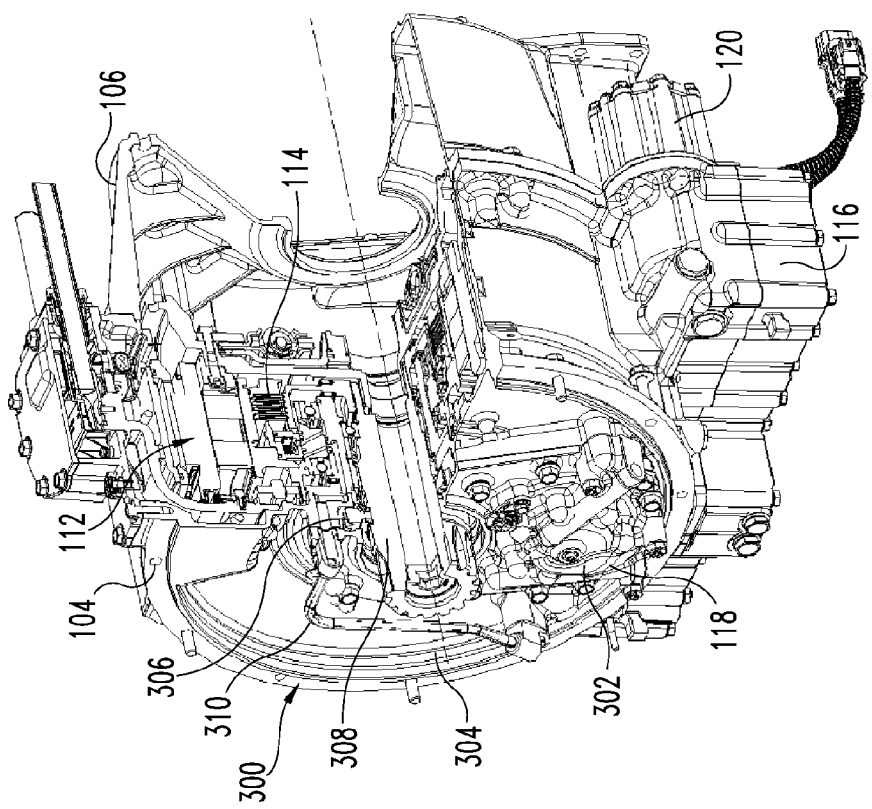
FIG. 9 is a perspective, partial cross-sectional view of a hybrid module-transmission subassembly.

Referring now to FIG. 9, a front perspective view is provided which includes a partial cross section through the hybrid module 104 from the perspective of the engine engagement side 300 of the hybrid module 104. On the engine engagement side 300, the hybrid module 104 has the mechanical pump 118 with a pump housing 302 that is secured to the hybrid module housing 304. A pump drive gear 306 which is secured to an input shaft 308 is used to drive the mechanical pump 118. The drive gear 306 in one example is secured to the input shaft 308 via a snap ring and key arrangement, but it is contemplated that the drive gear 306 can be secured in other manners. The mechanical pump 118 in conjunction with the electric pump 120 supplies fluid for lubrication, hydraulics, and/or cooling purposes to the hybrid module 104. By incorporating the electric pump 120 in conjunction with the mechanical pump 118, the mechanical pump 118 can be sized smaller, which in turn reduces the required space it occupies as well as reduces the cost associated with the mechanical pump 118. Moreover, the electric pump 120 facilitates lubrication even when the engine 102 is OFF. This in turn facilitates electric-only operating modes as well as other modes of the hybrid system 100. Both the mechanical pump 118 and the electric pump 120 recirculate fluid from the sump 116. The fluid is then supplied to the remainder of the hybrid module 104 via holes, ports, openings and other passageways traditionally found in transmissions for circulating oil and other fluids. A clutch supply port 310 supplies oil that hydraulically applies or actuates the clutch 114. In the illustrated embodiment, the clutch supply port 310 is in the form of a tube, but is envisioned it can take other forms, such as integral passageways within the hybrid module 104, in other examples.

The operation of the hybrid system 100 involves or includes various operational modes or status conditions, also referred to herein as "system modes" or simply "modes". The principal hybrid system 100 modes are summarized in Table II which is provided below:

TABLE II

SYSTEM MODES

| Mode | Clutch | Motor | PTO | Transmission |
|---|---|---|---|---|
| Engine Start | Engaged | Motor | Inoperative | Neutral |
| Charge Neutral | Engaged | Generator | Inoperative | Neutral |
| eAssist Propulsion | Engaged | Motor | Inoperative | In Gear |
| eDrive | Disengaged | Motor | Inoperative | In Gear |
| Propulsion with Charge | Engaged | Generator | Inoperative | In Gear |
| Regeneration Charging | Disengaged | Generator | Inoperative | In Gear |
| No Charge Braking | Engaged | N/A | Inoperative | In Gear |
| PTO | Engaged | N/A | Operative | Neutral |
| ePTO | Disengaged | Motor | Operative | Neutral |

During an initialization and/or startup mode, the electric pump 120 is activated by the transmission/hybrid control module 148 so as to circulate fluid through the hybrid module 104. The electric pump 120 receives its power from the energy storage system 134 via the inverter 132 (FIG. 1). Once sufficient oil pressure is achieved, the clutch 114 is engaged. At the same time or before, the PTO is inoperative or remains inoperative, and the transmission 106 is in neutral or remains in neutral. With the clutch 114 engaged, the eMachine 112 acts as a motor and in turn cranks the engine 102 in order to start (i.e., spin/crank) the engine. When acting like a motor, the eMachine 112 draws power from the energy storage system 134 via the inverter 132. Upon the engine 102 starting, the hybrid system 100 shifts to a charge neutral mode in which the fuel is on to the engine 102, the clutch 114 is engaged, and the eMachine 112 switches to a generator mode in which electricity generated by its rotation is used to charge the energy storage modules 136. While in the charge neutral mode, the transmission remains in neutral.

From the charge neutral mode, the hybrid system 100 can change to a number of different operational modes. The various PTO operational modes can also be entered from the charge neutral mode. As should be understood, the hybrid system is able to move back and forth between the various operational modes. In the charge neutral mode, the transmission is disengaged, that is, the transmission is in neutral. Referring to Table II, the hybrid system 100 enters a propulsion assist or eAssist propulsion mode by placing the transmission 106 in gear and having the eMachine 112 act as a motor.

During the eAssist propulsion mode, a PTO module is inoperative and the fuel to the engine 102 is on. In the eAssist propulsion mode, both the engine 102 and the eMachine 112 work in conjunction to power the vehicle. In other words, the energy to power the vehicle comes from both the energy storage system 134 as well as the engine 102. While in the eAssist propulsion mode, the hybrid system 100 can then transition back to the charge neutral mode by placing the transmission 106 back into neutral and switching the eMachine 112 to a generator mode.

From the eAssist propulsion mode, the hybrid system 100 can transition to a number of different operational states. For instance, the hybrid system 100 can transition from the eAssist propulsion mode to an electrical or eDrive mode in which the vehicle is solely driven by the eMachine 112. In the eDrive mode, the clutch 114 is disengaged, and the fuel to the engine 102 is turned off so that the engine 102 is stopped. The transmission 106 is placed in a driving gear. As the eMachine 112 powers the transmission 106, the PTO module is inoperative. While in the eDrive mode, the electric pump 120 solely provides the hydraulic pressure for lubricating the hybrid module 104 and controlling the clutch 114, because the mechanical pump 118 is not powered by the stopped engine 102. During the eDrive mode, the eMachine 112 acts as a motor. To return to the eAssist propulsion mode, the electric pump 120 remains on to provide the requisite back pressure to engage the clutch 114. Once the clutch 114 is engaged, the engine 102 is spun and fuel is turned on to power the engine 102. When returning to the eAssist propulsion mode from the eDrive mode, both the eMachine 112 and the engine 102 drive the transmission 106, which is in gear.

The hybrid system 100 also has a propulsion charge mode, a regenerative braking charge mode, and a compression or engine-braking mode. The hybrid system 100 can transition to the propulsion charge mode from the charge neutral mode, the eAssist propulsion mode, the regenerative braking charge mode, or the engine-braking mode. When in the propulsion charge mode, the engine 102 propels the vehicle while the eMachine 112 acts as a generator. During the propulsion charge mode, the clutch 114 is engaged such that power from the engine 102 drives the eMachine 112 and the transmission 106, which is in gear. Again, during the propulsion charge mode, the eMachine 112 acts as a generator, and the inverter 132 converts the alternating current produced by the eMachine 112 to direct current, which is then stored in the energy storage system 134. In this mode, the PTO module is in an inoperative state. While in the propulsion charge mode, the mechanical pump 118 generally handles most of the oil pressure and lubricant needs, while the electric pump 120 provides eMachine cooling. The load between the mechanical 118 and electric 120 pumps is balanced to minimize power loss.

The hybrid system 100 can transition to a number of operational modes from the propulsion charge mode. For example, the hybrid system 100 can transition to the charge neutral mode from the propulsion charge mode by placing the transmission 106 in neutral. The hybrid system 100 can return to the propulsion charge mode by placing the transmission 106 into gear. From the propulsion charge mode, the hybrid system 100 can also switch to the propulsion assist mode by having the eMachine 112 act as an electric motor in which electricity is drawn from the energy storage system 134 to the eMachine 112 such that the eMachine 112 along with the engine 102 drive the transmission 106. The regenerative charge mode can be used to recapture some of the energy that is normally lost during braking. The hybrid system 100 can transition from the propulsion charge mode to the regenerative charge mode by simply disengaging the clutch 114. In some instances, it may be desirable to use the engine-braking mode to further slow down the vehicle and/or to reduce wear of the brakes. Transitioning to the engine-braking mode can be accomplished from the propulsion charge mode by turning off the fuel to the engine 102. During the engine-braking mode, the eMachine 112 acts as a generator. The hybrid system 100 can return to the propulsion charge mode by turning back on the fuel to the engine 102. Simply disengaging the clutch 114 will then switch the hybrid system 100 to the regenerative charging mode.

The hybrid system 100 is able to conserve energy normally lost during braking by utilizing the regenerative braking/charge mode. During the regenerative charge mode, the clutch 114 is disengaged. The eMachine 112 acts as a generator while the transmission 106 is in gear. The power from the wheels of the vehicle is transferred through the transmission 106 to the eMachine 112, which acts as a generator to reclaim some of the braking energy and in turn helps to slow down the vehicle. The recovered energy via the inverter 132 is stored in the energy storage system 134. As noted in Table II above, during this mode the PTO module is inoperative.

The hybrid system 100 can transition from the regenerative charge mode to any number of different operational modes. For instance, the hybrid system 100 can return to the propulsion assist mode by engaging the clutch 114 and switching the eMachine 112 to act as a motor. From the regenerative charge mode, the hybrid system 100 can also return to the propulsion charge mode by engaging the clutch 114, and switching the eMachine 112 to the generator role. The hybrid system 100 can also switch to the engine-braking mode from the regenerative charge mode by turning off the fuel to the engine 102 and engaging the clutch.

In addition to the regenerative braking mode, the hybrid system 100 can also utilize the engine-braking mode in which compression braking of the engine 102 is used to slow down the vehicle. During the engine braking mode, the transmission 106 is in gear, the PTO module is inoperative, and the eMachine 112 is acting as a generator so as to recover some of the braking energy, if so desired. However, during other variations of the engine-braking mode, the eMachine 112 does not need to act as a generator such that the eMachine 112 draws no power for the energy store system module 134. To transmit the energy from the vehicle's wheels, the engine clutch 114 is engaged and the power is then transmitted to the engine 102 while the fuel is off. In another alternative, a dual regenerative and engine braking mode can be used in which both the engine 102 and the eMachine 112 are used for braking and some of the braking energy from the eMachine 112 is recovered by the energy storage system module 134.

The hybrid system 100 can transition from the engine-braking mode to any number of different operational modes. As an example, the hybrid system 100 can switch from the engine-braking mode to the propulsion assist mode by turning on the fuel to the engine 102 and switching the eMachine 112 to act as an electric motor. From the engine-braking mode, the hybrid system 100 can also switch to the propulsion charge mode by turning back on the fuel to the engine 102. In addition, the hybrid system 100 can switch from the engine-braking mode to the regenerative charge mode by turning on the fuel to the engine 102 and disengaging the clutch 114.

When the PTO is used, the vehicle can be stationary or can be moving (e.g., for refrigeration systems). From the charge neutral mode, the hybrid system 100 enters a PTO mode by engaging the PTO. While in the PTO mode, the clutch 114 is engaged such that power from the engine 102 is transmitted to the now-operative PTO. During this PTO mode, the eMachine 112 acts as a generator drawing supplemental power from the engine 102 and transferring it via the inverter 132 to the energy storage system module 134. At the same time, the transmission 106 is in neutral so that the vehicle can remain relatively stationary, if desired. With the PTO operative, the ancillary equipment, such as the lift buckets, etc., can be used. The hybrid system 100 can return to the charge neutral mode by making the PTO inoperative.

During the PTO mode, the engine 102 is constantly running which tends to waste fuel as well as create unnecessary emissions in some work scenarios. Fuel can be conserved and emissions reduced from the hybrid system 100 by switching to an electric or ePTO mode of operation. When transitioning to the ePTO mode, the clutch 114, which transmits power from the engine 102, is disengaged and the engine 102 is stopped. During the ePTO mode, the eMachine 112 is switched to act as an electric motor and the PTO is operative. At the same time, the transmission 106 is in neutral and the engine 102 is stopped. Having the engine 102 turned off reduces the amount of emissions as well as conserves fuel.

The hybrid system 100 can return from the ePTO mode to the PTO mode by continued operation of the electric 120 pump, engaging the clutch 114 and starting the engine 102 with the eMachine 112 acting as a starter. Once the engine 102 is started, the eMachine 112 is switched over to act as a generator and the PTO is able to operate with power from the engine 102.

With the operation or system modes of hybrid system 100 (see Table II) in mind, the hydraulic system 200 is now further described in the context of three modes of operation. These three modes include an Electric Mode (eMode), a Transition Mode, and a Cruise Mode. From the perspective of the status and conditions of hydraulic system mode, the eMode conditions are diagrammatically illustrated in FIG. 10. The Transition Mode conditions are diagrammatically illustrated in FIG. 11. The Cruise Mode conditions are diagrammatically illustrated in FIG. 12.

Figure 10:
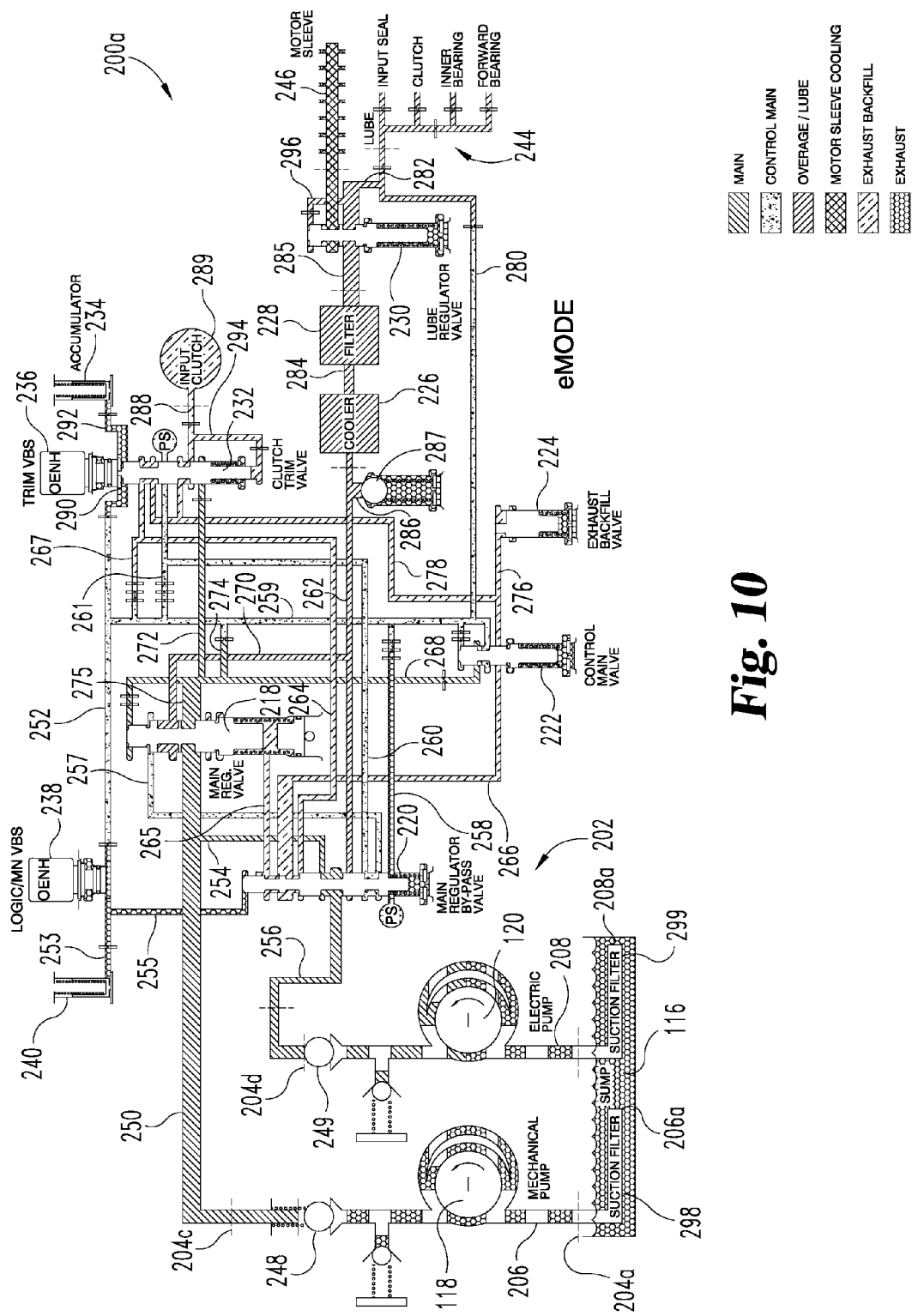
FIG. 10 is a diagrammatic illustration of the FIG. 2 hydraulic system when the hydraulic system is in an eMode.

Referring first to FIG. 10, in the eMode condition, as represented by hydraulic system 200a, the engine and clutch are each in an "OFF" condition, and each solenoid 236 and 238 is an "OFF" condition. The electric pump 120 provides one hundred percent (100%) of the oil flow to the main regulator valve 218. With solenoid 238 in an "OFF" condition, there is no solenoid signal to the main regulator by-pass valve 220 and this component is also considered as being in an "OFF" condition. In the exemplary embodiment, the main pressure is "knocked down" to 45 psi due to using only the electric pump 120 and considering its performance limitations. Any lube/cooling flow to the cooler 226 is the result of main regulator valve 218 overage.

Figure 11:
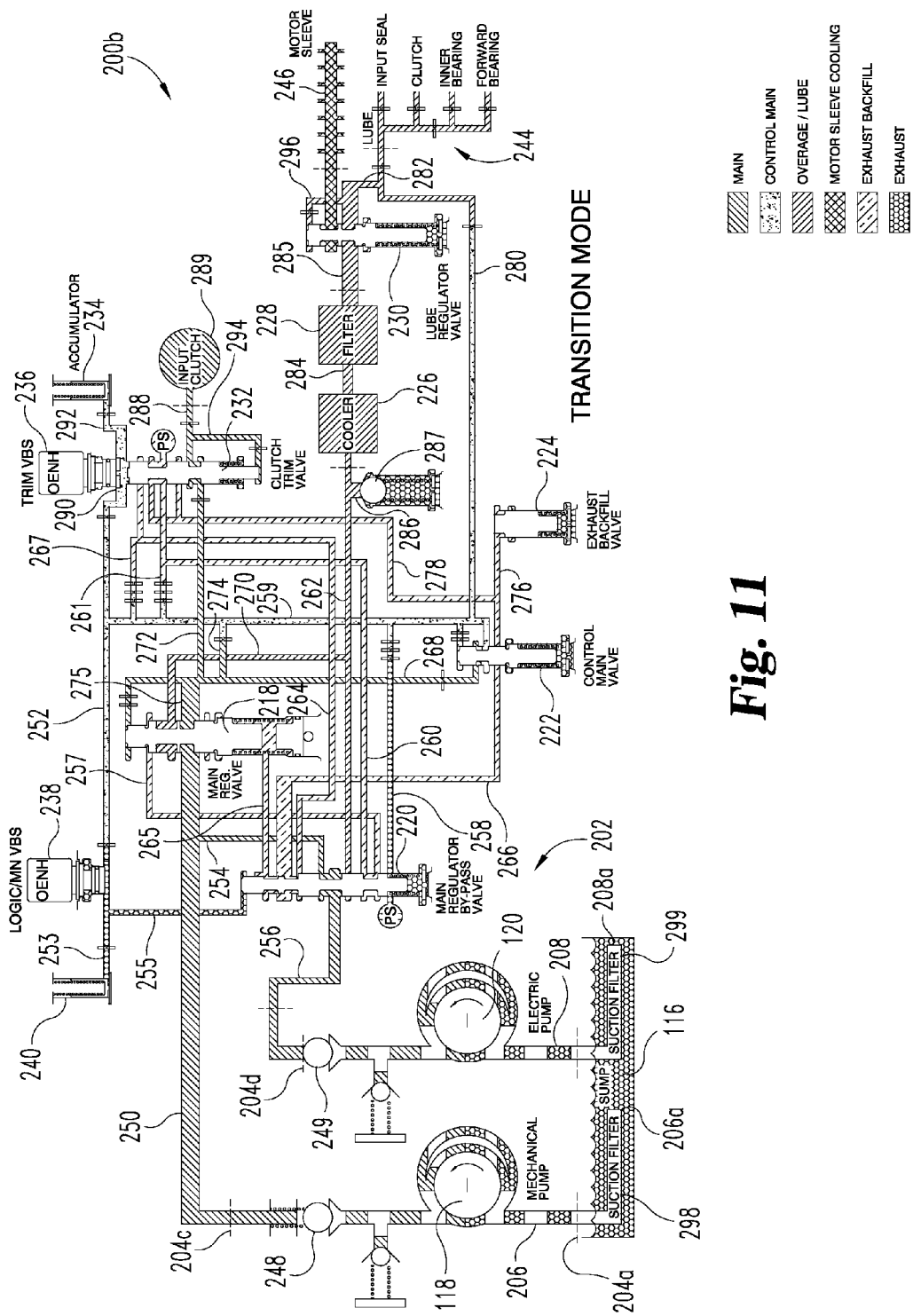
FIG. 11 is a diagrammatic illustration of the FIG. 2 hydraulic system when the hydraulic system is in a Transition Mode.

Referring now to FIG. 11, in the Transition Mode condition as represented by hydraulic system 200b, the engine may be in either an "ON" or "OFF" condition, the clutch is in an "ON" condition, solenoid 238 is "OFF", and solenoid 236 is "ON". The electric pump 120 and the mechanical pump 118 can supply a flow of oil to the main regulator valve 218. The knockdown is removed and the main pressure is 90 psi. Any lube/cooling flow to the cooler 226 is the result of main regulator valve 218 overage.

Figure 12:
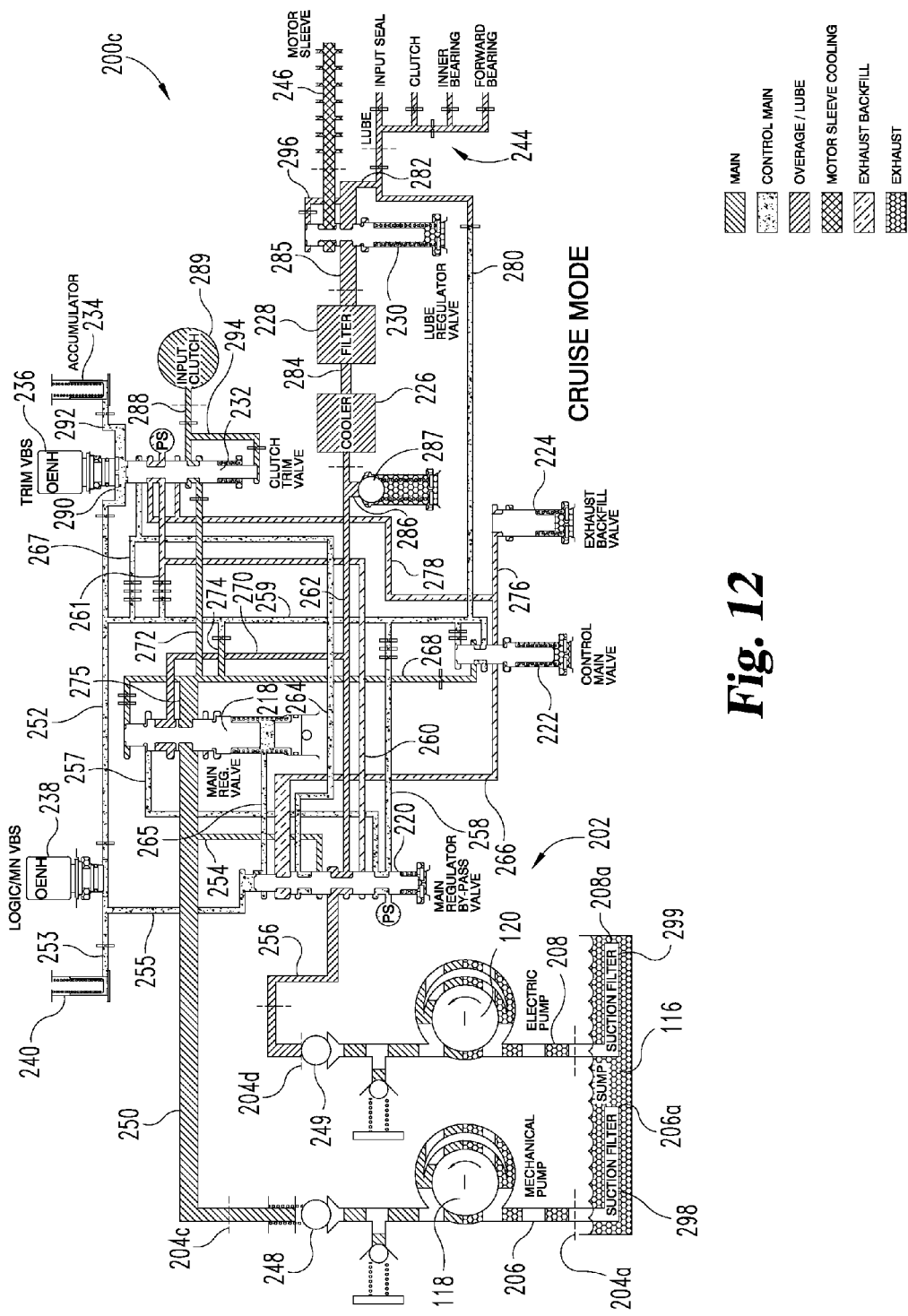
FIG. 12 is a diagrammatic illustration of the FIG. 2 hydraulic system when the hydraulic system is in a Cruise Mode.
Figure 15:
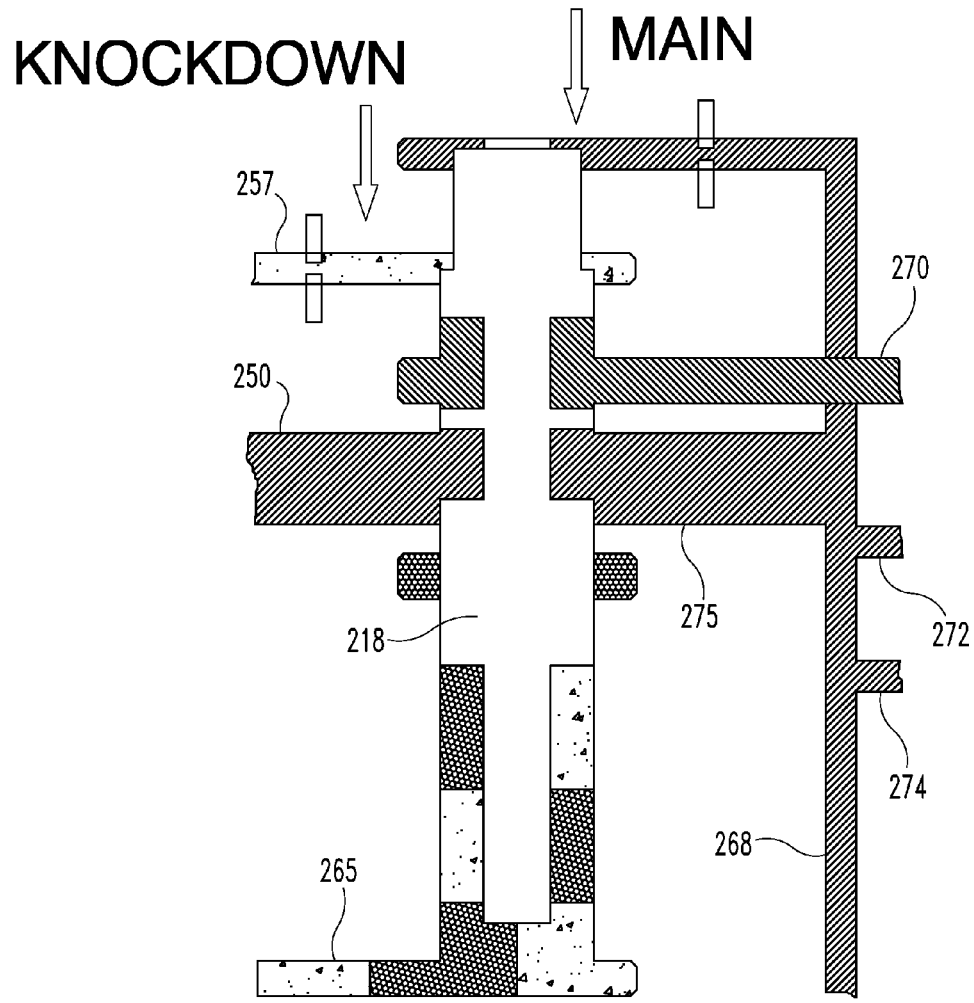
FIG. 15 is a diagrammatic illustration of the FIG. 3 main regulator valve in the Cruise Mode.

Referring now to FIG. 12, in the Cruise Mode, as represented by hydraulic system 200c, the engine and clutch are each in an "ON" condition, and solenoid 236 is in an "ON" condition. The main regulator by-pass valve 220 is held in the "ON" (applied) position by a hydraulic latch. This hydraulic latch has a signal pressure which comes from the clutch trim valve 232 and the latch is only active when both the clutch trim valve 232 and the main regulator by-pass valve 220 are in the "ON"/applied position. In this condition, the mechanical pump 118 provides one hundred percent (100%) of the oil flow to the main regulator valve 218 and to the clutch control hydraulics. The electric pump 120 provides supplemental cooler flow (or what may be referred to as cooler flow "boost"). The flow to the cooler 226 is by way of the main regulator valve 218 overage and supplemented by flow from the electric pump 120. To initially turn the main regulator by-pass valve 220 to the "ON" condition, solenoid 238 is briefly turned on. Once the main regulator by-pass valve 220 is in the ON condition the hydraulic latch becomes active and solenoid 238 is no longer required to hold the main regulator by-pass valve 220 in the "ON" position. Also, once the main regulator by-pass valve 220 is on the ON position, the output of solenoid 238 is connected to the base of the main regulator valve 218 and is now used as boost pressure. With this variable solenoid 238 supplying boost pressure, the main regulator valve 218 now produces a variable main pressure between 45 and 225 psi depending upon the pressure of solenoid 238, see FIG. 15.

The three modes which have been described and illustrated in FIGS. 10-12 have been identified in conjunction with hydraulic systems 200a, 200b, and 200c, respectively. This numbering scheme of letter suffixes is representative of the fact that the hardware, components, subassemblies, and conduits of hydraulic system 200 do not change with the different modes of operation. However, the operational status, the various ON/OFF conditions, etc. of the hardware, components, and subassemblies may change, depending on the particular item and the specific mode of operation.

While the three described modes for the hydraulic system 200 are based in part on the status or conditions of the engine, these modes are also based in part on the ON/OFF status of the referenced hardware, components, and subassemblies, including the mechanical pump 118 and the electric pump 120. The mechanical pump 118 is directly connected to the engine 102 such that when the engine is ON, the mechanical pump 118 is ON. When the engine 102 is OFF, the mechanical pump 118 is OFF. When ON, the mechanical pump 118 delivers oil to the entire hydraulic system. Any overage from the main regulator valve 218 is delivered to the cooler 226.

The ON/OFF status of the electric pump 120 and the speed of the electric pump 120 are controlled by the electronics of the hybrid module 104. The electric pump 120 delivers oil either to the hydraulic system 200 and/or to the cooler 226. When the mechanical pump 118 is either OFF or when its delivery of oil is insufficient, the electric pump 120 delivers oil to the hydraulic system. When the delivery of oil from the mechanical pump is sufficient, the electric pump 120 is able to be used for delivery of oil to the cooler for lube and motor cooling.

Reference has been made to the knocked down lower pressure level for certain operational modes. This knocked down pressure is associated with operation of the electric pump 120. Considering the various pressure levels and flow rates, the main pressure of the mechanical pump 118 is 45-225 psi. The main pressure of the electric pump 120 is 45 or 90 psi. For lube and cooling, the first 5.0 lpm of flow at approximately 30 psi is used for lube. Any excess flow up to approximately 15.0 lpm is delivered to the motor cooling sleeve 246. A maximum of 50 psi for the lube/cooling function is attained only after the motor cooling sleeve 246 is filled with oil. The clutch applied pressure will be nearly equal to main pressure with a slight pressure drop (0-5 psi) due to the clutch passageways.

With continued reference to FIG. 2, there are specific portions of the disclosed hydraulic system 200 which denote changes and improvements over earlier designs and embodiments. One improvement is that separate suction filters 298 and 299 are incorporated into each pump inlet conduit 206 and 208, respectively. Each suction filter 298 and 299 is positioned adjacent the inlet opening 206a and 208a of each conduit, respectively.

Another improvement is directed to reconfigured logic for main regulator by-pass valve 220. The flow circuitry and logic of control main valve 222 is also modified over earlier embodiments for increased consistency. A further improvement is adding a control main valve lube bleed by the addition of flow conduit 280. A further improvement relates to the exchange of an ON/OFF solenoid with a variable bleed solenoid (VBS) which is mulitiplexed to operate between the logic valve 220 and main boost. A still further improvement is directed to the main regulator valve 218 and a main modulation boost when the logic valve 220 is applied.

Referring now to the functionality of the mechanical pump 118 and the electric pump 120, the mechanical pump 118 is connected to the engine input with a 1:1 drive ratio. As such, when the engine is ON the mechanical pump 118 is ON. When the engine is OFF, the mechanical pump is OFF. The mechanical pump 118 directly feeds the main regulator valve 218. The first lube priority is to the valve body and clutch needs. The second lube priority is for the cooler and the lube circuit. The main pressure relief is set at 400 psi.

The speed and flow of the electric pump 120 are dictated by the engine software and system programming, specifically by the transmission control module software. The electric pump 120 supplies oil to either the main regulator valve or by-passes to the cooler 226 and lube circuit. The referenced "lube circuit" is generally referred to as reference 244 (bearings, etc.). The operation of the electric pump 120 is dependent on the hydraulic mode. Further, the electric pump 120 is able to supply oil or lube to cooler flow when the lube delivery by the mechanical pump 118 is not adequate. The electric pump 120 pressure relief is set at 120 psi.

The hydraulic modes of operation of hydraulic system 200 include, as noted above, eMode (FIG. 10), Transition Mode (FIG. 11), and Cruise Mode (FIG. 12). The flow circuit and flow paths for each hydraulic mode are illustrated in FIGS. 10-12, noting the drawing key which identifies the nature of the flow based on the graphic cross-hatching. In the eMode, the engine is OFF and the clutch is OFF. All of the hydraulics are supplied by the electric pump 120. In the Transition Mode, the engine transitions from OFF to ON and the clutch is applied. Both the mechanical pump 118 and the electric pump 120 supply lube to the main regulator valve. In the Cruise Mode, the engine is ON and the clutch is ON. The mechanical pump 118 supplies the hydraulics for clutch control. The electric pump 120 provides the hydraulics for the cooler flow "boost".

With continued reference to FIGS. 10-12, it is noted that in the eMode of FIG. 10, both solenoids 236 and 238 are hydraulically OFF. The main knock down pressure is 45 psi. Any flow or supply overage from the main is directed to the cooler. In the Transition Mode of FIG. 11, the trim solenoid 236 is hydraulically ON and the logic solenoid 238 is hydraulically OFF. Both the mechanical pump 118 and the electric pump 120 supply flow to the main regulator valve 218. Both pumps are set an operating pressure of 90 psi (knockdown exhausted). Any lube overage is directed to the cooler 226. In the Cruise Mode of FIG. 12, solenoid 236 is hydraulically ON and solenoid 238 is variable. The lube from the electric pump 120 is supplied to the cooler. The mechanical pump 118 supplies lube to the main regulator valve 218. The main regulator pressure is torque dependent and between 45 psi and 225 psi (knockdown and boost). The electric pump pressure is flow dependent and operates between 0 and 70 psi. Table III provides a quick reference for some of the operational parameters for each operational mode.

TABLE III

Mode Chart Reference Table

| Mode | ePump | ePump Pressure | ePump Output | mPump | mPump Pressure | Clutch | Main Knockdown | Main Boost |
|---|---|---|---|---|---|---|---|---|
| eMode | On | 45 psi | Main Reg | Onn | — | Open | Pressurized | Exhausted |
| Transition | On | 90 psi | Main Reg | On/Off | 90 psi | Applying/Applied | Exhausted | Exhuasted |
| Cruise | On/Off | 0-70 psi | To cooler | On | 45-225 psi | Applied | Pressurized | Variable Pressure |

Figure 13:
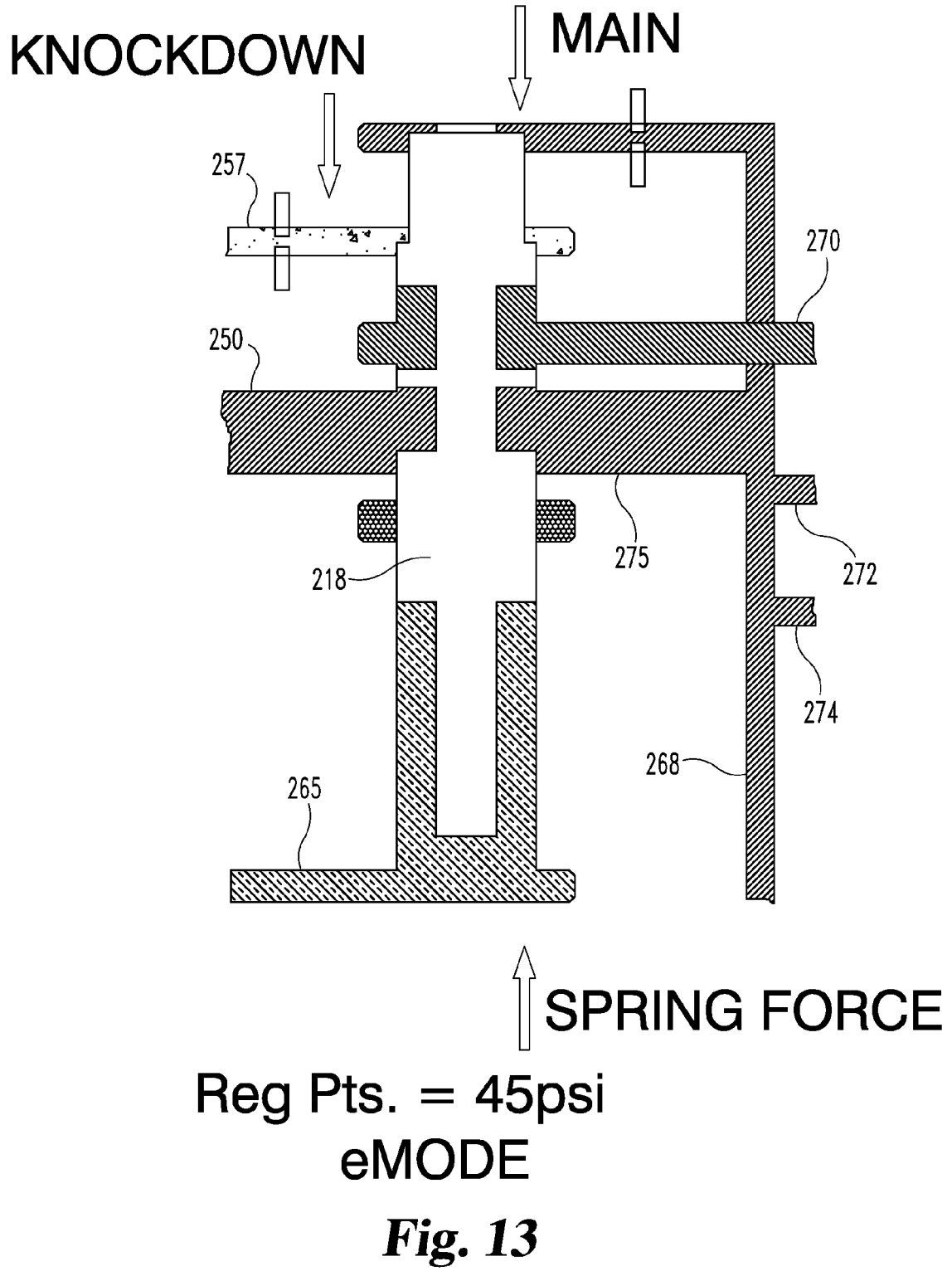
FIG. 13 is a diagrammatic illustration of the FIG. 3 main regulator valve in the eMode.
Figure 14:
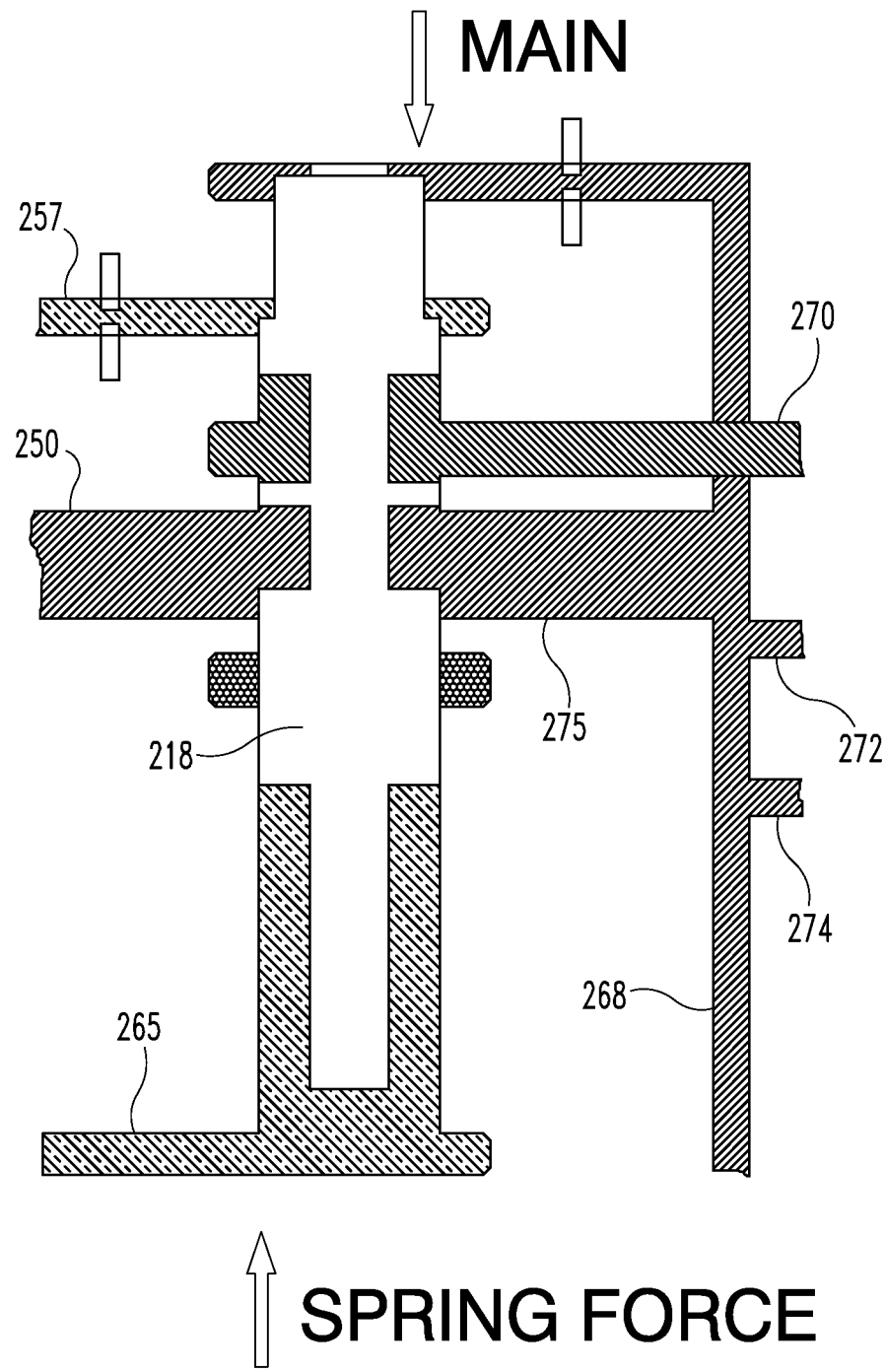
FIG. 14 is a diagrammatic illustration of the FIG. 3 main regulator valve in the Transition Mode.

Regarding some of the specifics of main regulator valve 218, it is a dual regulation valve with both exhaust and overage to cooler 226. For the knockdown and boost aspects, the electric pump pressure is either 45 psi or 90 psi. The mechanical pump pressure is a variable between 45 psi and 225 psi. A lower rate spring is used so that there is less force or pressure acting against the flow fluctuations. The three modes operation relative to the main regulator valve 218 as described above, at least in part, are diagrammatically illustrated in FIGS. 13, 14 and 15.

Regarding some of the specifics of the control main valve 222, this is a single regulation valve which regulates at 110 psi and routes any lube overage to the exhaust backfill valve 224. There are two by-pass orifices which handle lube flow from the main regulator valve 218 and direct lube in the direction of the downstream lube requirements (bearings 244). Regarding some of the specifics of the clutch trim valve 232, this valve interfaces with solenoid 236 and accumulator 234. The regulation pressure ranges between 195 psi and 225 psi.

The lube regulator valve 230 is a dual regulation valve which assists in providing lube to the eMotor sleeve 246 as a second priority and to the lube requirements (bearings 244) as a first priority. Once the lube requirements are met, any additional lube which is available is directed to the motor sleeve 246. The by-pass orifice provides lube flow under low flow conditions for failure mode protection.

The main regulator by-pass valve 220, also called the logic valve, directs flow in a number of different ways. The lube from the electric pump 120 is directed to the main regulator valve 218 and to the cooler 226. The other states or functions of lube control and management include knockdown (pressurized/exhaust), boost (exhausted/pressurized), latch (exhausted/pressurized), and pressure switch (exhausted/pressurized).

Figure 16:
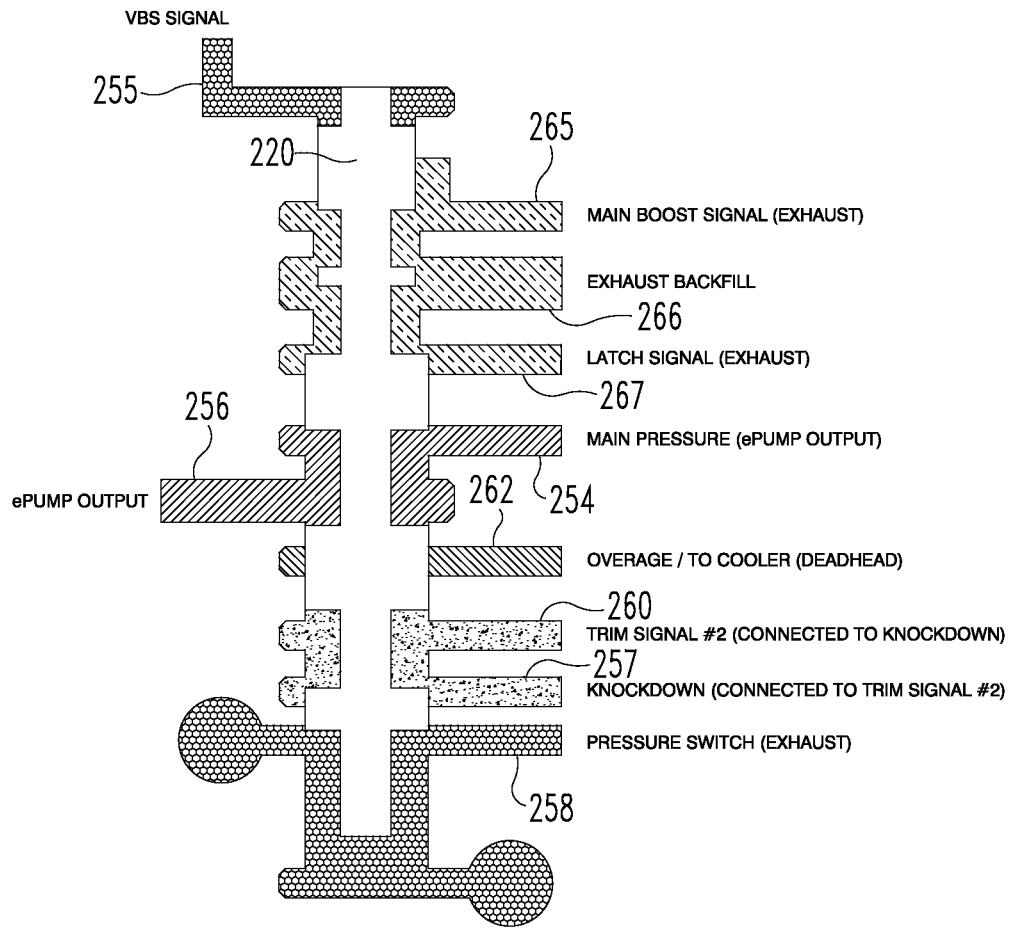
FIG. 16 is a diagrammatic illustration of the FIG. 4 main regulator by-pass valve in the eMode.
Figure 17:
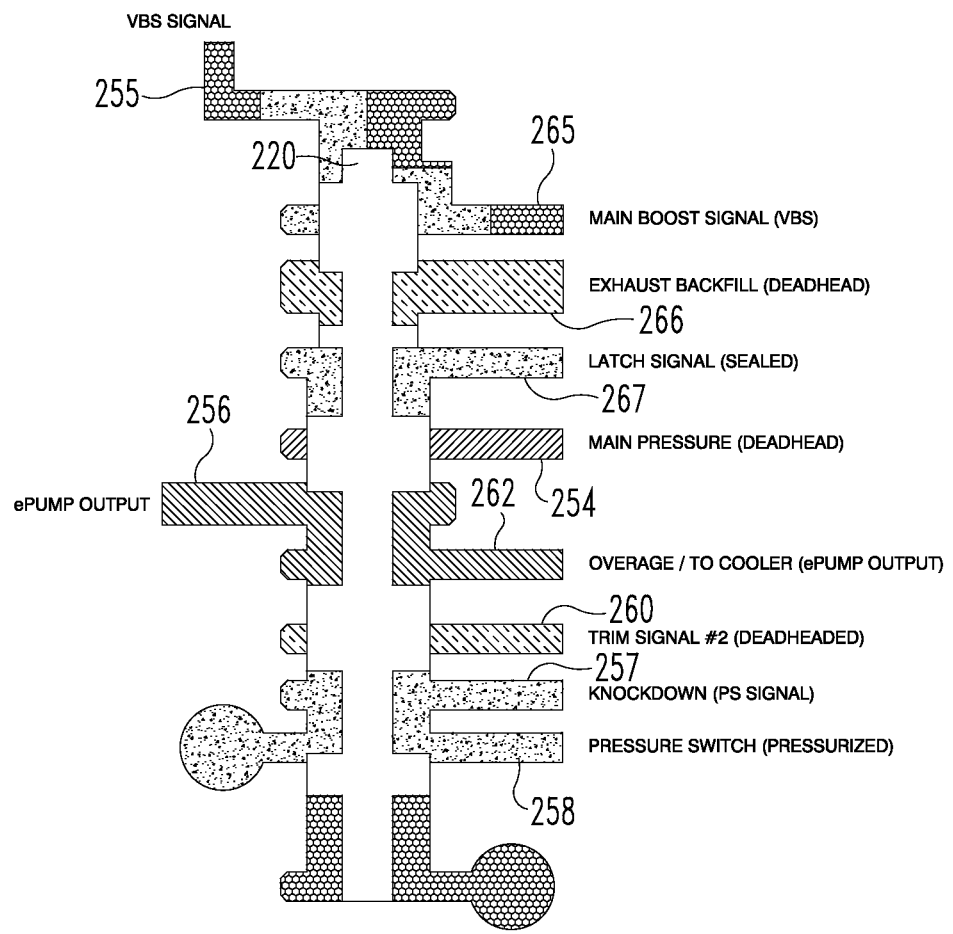
FIG. 17 is a diagrammatic illustration of the FIG. 4 main regulator by-pass valve in the Cruise Mode.

The solenoid 238 strokes valve 220 from installed to applied. If the clutch is OFF then the solenoid is needed to hold the valve at the applied position. If the clutch is ON, then a latch status holds the valve at the applied position. In this ON condition, the solenoid 238 is not needed to hold the valve at the applied position and the solenoid, via multiplexing, is available for the main modulation boost. The logic valve 220 de-strokes when the latch is exhausted by the clutch trim valve 232. In terms of any failure mode or status, one would be when the logic valve electrically fails to go to the valve applied position. In this state, the electric pump 120 lube goes to the cooler 226. Since there is a high main pressure, any risk of a low pressure failure mode is removed. FIGS. 16 and 17 provide graphic illustrations of the main regulator by-pass valve 220 in the installed position (eMode) and in the applied position (Cruise Mode). The labels on the ports and conduits are consistent with what has been described above.

Regarding some of the specifics of the exhaust backfill valve 224, this valve manages the supply of low pressure oil to the clutch 289. The setpoint is at 2 psi and the use of this low pressure lube helps to keep air out of the clutch and facilitates fill time consistency. One-way valve 287 (see FIG. 2) which is a cooler pressure relief valve has a set point of 140 psi and is based on a ball and spring construction.

In addition to suction filters 298 and 299 which are associated with the pump inlets, a third filter 228 is included as a lube filter which is downstream from the cooler. The lube filter 228 is a low micron filter. Filters 298 and 299 share a common body but are separate hydraulically. The lube filter 228 is a spin-on filter.

Some of the other features of hydraulic system 200 include the design and construction of the interface of the normally applied clutch. In the event of an electrical failure with the engine On, the system defaults to a high main and the clutch is applied. With the engine Off, the system defaults to neutral (no starter). In effect there are two pressure switches corresponding to the logic valve 220 and the clutch trim 232. Both pumps 118 and 120 are constructed and arranged for one-way flow so as to prevent back flow and leakage around the pumps.

Another feature of hydraulic system 200 is the addition (new design) of a main modulation control scheme which relies in part on the addition of VBS solenoid 238 and the multiplexing (modulation) of that solenoid. By controlling the main pressure at a reduced level, the fuel economy and reliability are improved. The pressure is controlled by the multiplexed VBS solenoid 238 in order to maintain adequate clutch pressure based on torque requirements. The overall system cost is reduced by this multiplexing of valves and solenoids. The disclosed hydraulic system 200 provides a reduced pressure schedule based on torque to reduce spin losses (improves fuel economy) and increase cooler flow (improves reliability). By integrating this reduced pressure schedule with the multiplexing of solenoids and valves, cost is reduced.

In the FIGS. 2 and 2A illustrations, it will be seen that only two solenoids 236 and 238 are used to control pressure. In fact, only two solenoids are able to be used since the hybrid control module (HCM) only includes two drivers. When multiplexing the VBS solenoid 238, it can be used to get different pressure levels, including a reduced pressure for certain conditions and applications. Reducing the pressure results in a reduced pump load on the electric pump 120. When the electric pump 120 has a lower load, then the electric pump is not working as hard. A lower pressure requirements means that there is more lube to the bearings and cooler.

One of the characteristics of hydraulic system 200 as noted above is the design and construction facilitated by multiplexing and the overall main modulation control scheme which decreases the pump work. A high pressure is required in order to keep the clutch from slipping at high torque. However, as the torque level changes, pressure adjustments are possible. The option, as presented here, is to adjust the pressure based on the torque level of the gearbox.

While the preferred embodiment of the invention has been illustrated and described in the drawings and foregoing description, the same is to be considered as illustrative and not restrictive in character, it being understood that all changes and modifications that come within the spirit of the invention are desired to be protected.

The invention claimed is:

1. A hydraulic system for a hybrid electrical vehicle comprising:
   a sump containing hydraulic fluid;
   a main regulator valve constructed and arranged in flow communication with said sump;
   a main regulator by-pass valve constructed and arranged in flow communication with said sump;
   first and second control solenoids wherein said first control solenoid is a variable bleed solenoid; and
   a control module for managing fluid flow of said hydraulic system, wherein said control module is constructed and arranged for multiplexing of said variable bleed solenoid, wherein said multiplexing is applied for said variable bleed solenoid to either hold the main regulator by-pass valve at an applied position or make the variable bleed solenoid available for main boost.

2. The hydraulic system of claim 1 wherein the hybrid electric vehicle has three operational modes associated with the hydraulic system, including an eMode, a transition mode and a cruise mode.

3. The hydraulic system of claim 1 which further includes a mechanical pump constructed and arranged in flow communication with said sump and in flow communication with said main regulator valve for delivering hydraulic fluid from said sump to said main regulator valve.

4. The hydraulic system of claim 3 which further includes an electric pump constructed and arranged in flow communication with said sump and in flow communication with said main regulator by-pass valve for delivering hydraulic fluid from said sump to said main regulator by-pass valve.

5. The hydraulic system of claim 4 wherein said control module is constructed and arranged for managing the operational status of said mechanical pump and of said electric pump based on an operational mode of the hybrid electric vehicle.

6. The hydraulic system of claim 1 wherein said first control solenoid is constructed and arranged in flow communication with said main regulator by-pass valve.

7. The hydraulic system of claim 1 which further includes a clutch trim valve.

8. The hydraulic system of claim 7 wherein said second control solenoid is constructed and arranged in fluid communication with said clutch trim valve.

9. The hydraulic system of claim 1 which further includes a lube bleed conduit in flow communication with a control main valve.

10. The hydraulic system of claim 1 wherein said control module is a hybrid control module with two drivers.

11. The hydraulic system of claim 10 wherein one of said two drivers corresponds to said variable bleed solenoid and the other of said two drivers corresponds to said second control solenoid.

12. The hydraulic system of claim 1 wherein said control module is constructed and arranged to adjust a pressure level of said hydraulic system based on a gearbox torque value.

13. A hydraulic system for a hybrid electrical vehicle comprising:
   a sump containing hydraulic fluid;
   a main regulator valve constructed and arranged in flow communication with said sump;
   a main regulator by-pass valve constructed and arranged in flow communication with said sump;
   a hybrid control module; and
   a control solenoid constructed and arranged in flow communication with said main regulator by-pass valve wherein said hybrid control module is constructed and arranged for the multiplexing of said control solenoid, wherein said multiplexing is applied for said control solenoid to either hold the main regulator by-pass valve at an applied position or make the control solenoid available for main boost.

14. The hydraulic system of claim 13 wherein said control solenoid is a variable bleed solenoid.

15. The hydraulic system of claim 14 wherein the hybrid electric vehicle has three operational modes associated with the hydraulic system, including an eMode, a transition mode and a cruise mode.

16. The hydraulic system of claim 15 wherein said hybrid control module is constructed and arranged with two drivers.

17. The hydraulic system of claim 16 wherein one of said two drivers corresponds to said variable bleed solenoid and the other of said two drivers corresponds to a second control solenoid.

18. The hydraulic system of claim 17 wherein said hybrid control module is constructed and arranged to adjust a pressure level of said hydraulic system based on a gearbox torque value.

19. A hydraulic system for a hybrid electrical vehicle comprising:
   a sump containing hydraulic fluid;
   a main regulator valve constructed and arranged in flow communication with said sump;
   a main regulator by-pass valve constructed and arranged in flow communication with said sump;
   first and second control solenoids wherein said first control solenoid is a variable bleed solenoid;
   a mechanical pump in flow communication with said sump;
   an electric pump in flow communication with said sump; and
   a control module for managing the operational status of each pump, wherein said control module is constructed and arranged for the multiplexing of said variable bleed solenoid, wherein said multiplexing is applied for said variable bleed solenoid to either hold the main regulator by-pass valve at an applied position or make the variable bleed solenoid available for main boost.

20. The hydraulic system of claim 19 wherein the hybrid electric vehicle has three operational modes associated with the hydraulic system, including an eMode, a transition mode and a cruise mode.

21. The hydraulic system of claim 19 wherein said first control solenoid is constructed and arranged in flow communication with said main regulator by-pass valve.

22. The hydraulic system of claim 19 which further includes a clutch trim valve.

23. The hydraulic system of claim 22 wherein said second control solenoid is constructed and arranged in fluid communication with said clutch trim valve.

24. A hydraulic system for a hybrid electrical vehicle comprising:
   a sump containing hydraulic fluid;
   a main regulator valve constructed and arranged in flow communication with said sump;
   a main regulator by-pass valve constructed and arranged in flow communication with said sump;

first and second control solenoids wherein said first control solenoid is a variable bleed solenoid;
a clutch trim valve; and
wherein said second control solenoid is constructed and arranged in fluid communication with said clutch trim valve.

25. The hydraulic system of claim 24 wherein the hybrid electric vehicle has three operational modes associated with the hydraulic system, including an eMode, a transition mode and a cruise mode.

26. The hydraulic system of claim 24 wherein said control module is constructed and arranged for managing the operational status of said mechanical pump and of said electric pump based on an operational mode of the hybrid electric vehicle.

27. The hydraulic system of claim 24 wherein said first control solenoid is constructed and arranged in flow communication with said main regulator by-pass valve.

28. A hydraulic system for a hybrid electrical vehicle comprising:
a sump containing hydraulic fluid;
a main regulator valve constructed and arranged in flow communication with said sump;
a main regulator by-pass valve constructed and arranged in flow communication with said sump;
first and second control solenoids wherein said first control solenoid is a variable bleed solenoid;
a clutch trim valve, wherein said second control solenoid is constructed and arranged in fluid communication with said clutch trim valve; and
a control module for managing fluid flow of said hydraulic system, wherein said control module is constructed and arranged for multiplexing of said variable bleed solenoid.

29. A hydraulic system for a hybrid electrical vehicle comprising:
a sump containing hydraulic fluid;
a main regulator valve constructed and arranged in flow communication with said sump;
a main regulator by-pass valve constructed and arranged in flow communication with said sump;
first and second control solenoids wherein said first control solenoid is a variable bleed solenoid;
a clutch trim valve, wherein said second control solenoid is constructed and arranged in communication with said clutch trim valve;
a mechanical pump in flow communication with said sump;
an electric pump in flow communication with said sump; and
a control module for managing the operational status of each pump, wherein said control module is constructed and arranged for the multiplexing of said variable bleed solenoid.

* * * * *